(12) United States Patent
Oyama et al.

(10) Patent No.: US 10,946,856 B2
(45) Date of Patent: Mar. 16, 2021

(54) VEHICLE DRIVE SYSTEM

(71) Applicant: Mazda Motor Corporation, Hiroshima (JP)

(72) Inventors: Hajime Oyama, Hiroshima (JP); Shigeo Yoshikawa, Hiroshima (JP); Hiroyuki Shirata, Hiroshima (JP); Hideki Sanai, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 25 days.

(21) Appl. No.: 16/579,629

(22) Filed: Sep. 23, 2019

(65) Prior Publication Data

US 2020/0114901 A1    Apr. 16, 2020

(30) Foreign Application Priority Data

Oct. 10, 2018  (JP) .............................. JP2018-191504

(51) Int. Cl.
*B60W 20/19*       (2016.01)
*B60W 20/40*       (2016.01)
(Continued)

(52) U.S. Cl.
CPC ............ *B60W 20/19* (2016.01); *B60W 10/11* (2013.01); *B60W 20/40* (2013.01); *B60W 30/025* (2013.01)

(58) Field of Classification Search
CPC ...... B60W 20/19; B60W 20/40; B60W 10/11; B60W 30/025; B60W 30/19; B60W 10/06;
(Continued)

(56) References Cited

U.S. PATENT DOCUMENTS 10,227,074 B2 *  3/2019  Bang .................... B60W 10/119
10,449,949 B2 * 10/2019  Kobayashi .......... F16H 61/0437
(Continued)

FOREIGN PATENT DOCUMENTS

EP      2650560 A1   10/2013
JP   2003287088 A   10/2003
(Continued)

OTHER PUBLICATIONS

European Patent Office, Extended European Search Report Issued in Application No. 19199249.4, dated Feb. 24, 2020, Germany, 17 pages.

*Primary Examiner* — Tinh Dang
(74) *Attorney, Agent, or Firm* — Alleman Hall Creasman & Tuttle LLP

(57) ABSTRACT

Provided is a vehicle drive system capable of suppressing a feeling of acceleration drop and free running, thereby improving vehicle riding comfort. The vehicle drive system includes: an internal combustion engine for driving a primary drive wheel; a stepped variable transmission; an assist motor for driving a secondary drive wheel; and a motor control device for controlling the assist motor, wherein the stepped variable transmission is a seamless-shift transmission configured such that a drive force to be transmitted therethrough is interrupted during shifting down, but not substantially interrupted during shifting up, and the motor control device is operable, during the shifting down by the stepped variable transmission, to cause the assist motor to generate a drive force to compensate for the interruption of the drive force.

6 Claims, 8 Drawing Sheets

(51) Int. Cl.
*B60W 30/02* (2012.01)
*B60W 10/11* (2012.01)
*F16H 61/04* (2006.01)
*B60K 6/52* (2007.10)
*B60K 7/00* (2006.01)

(58) Field of Classification Search
CPC ....... B60W 10/08; B60W 20/20; Y02T 10/72; Y02T 10/62; B60K 6/48; B60K 6/52; B60K 7/0007; B60K 2007/0038; B60K 2007/0092; B60K 6/24; B60K 6/26; B60K 6/36; F16H 63/18; F16H 61/684; F16H 61/04; F16H 2061/0433; F16H 3/089; F16H 2003/0811; F16H 2003/0818; F16H 2200/0052
See application file for complete search history.

(56) References Cited

U.S. PATENT DOCUMENTS

| | | |
|---|---|---|
| 2011/0168469 A1 | 7/2011 | Hansson |
| 2013/0228027 A1 | 9/2013 | Ikeya et al. |
| 2016/0059861 A1 | 3/2016 | Ikeya et al. |
| 2019/0001990 A1 | 1/2019 | Lucas et al. |

FOREIGN PATENT DOCUMENTS

| | | |
|---|---|---|
| JP | 5707119 B2 | 4/2015 |
| WO | 2017109645 A1 | 6/2017 |

\* cited by examiner

VEHICLE DRIVE SYSTEM

TECHNICAL FIELD

The present invention relates to a vehicle drive system, and more particularly to a vehicle drive system for driving a vehicle using an internal combustion engine.

BACKGROUND ART

In JP 2003-287088A (Patent Document 1), one type of automatic transmission is described. This automatic transmission is provided by using a gear-type manual transmission as a basic structure thereof and modifying it to automate a speed stage shifting operation, wherein shift fork selecting and shifting operations for a desired speed stage are automatically carried out by an actuator during speed stage shifting. Further, in this type of automatic transmission, it is possible to set a manual mode in which, in response to selection of a desired speed stage by a driver, an actuator performs shifting to the selected gear stage.

CITATION LIST

Patent Document

Patent Document 1: JP 2003-287088A

SUMMARY OF INVENTION

Technical Problem

However, in the automatic transmission provided by using a gear-type manual transmission as a basic structure thereof and modifying it to automate the speed stage shifting operation, as described in the Patent Document 1, there is a problem that a drive force to be transmitted is unavoidably interrupted during speed stage shifting. That is, if the drive force is interrupted due to speed stage shifting in a state in which a vehicle is accelerated, a vehicle acceleration temporarily decreases, which gives a passenger a "feeling of acceleration drop", resulting in deteriorated vehicle riding comfort. On the other hand, if speed stage shifting is performed in a state in which the vehicle is decelerated, and an internal combustion engine acts as a brake, the vehicle acceleration temporarily increases, which gives the passenger a "feeling of free running", resulting in deteriorated vehicle riding comfort.

It is therefore an object of the present invention to provide a vehicle drive system capable of, in a vehicle using a stepped (multistage) automatic transmission, suppressing the "feeling of acceleration drop" and the "feeling of free running" which would otherwise be given to a passenger during speed stage shifting, thereby improving vehicle riding comfort.

Solution to Technical Problem

In order to the above problem, the present invention provides a vehicle drive system for driving a vehicle using an internal combustion engine. The vehicle drive system comprises: an internal combustion engine configured to generate a drive force for driving a primary drive wheel of the vehicle; a stepped variable transmission connected to an output shaft of the internal combustion engine and configured to change a rotational speed of the output shaft of the internal combustion engine and output the changed rotational speed; an assist motor provided to apply a drive force to a secondary drive wheel of the vehicle, or apply a drive force to the primary drive wheel without going through the stepped variable transmission; and a motor control device configured to control a drive force to be output by the assist motor, wherein the stepped variable transmission is a seamless-shift transmission configured such that a drive force to be transmitted therethrough is interrupted during shifting down, but not substantially interrupted during shifting up, and the motor control device is operable, during the shifting down by the stepped variable transmission, to cause the assist motor to generate a drive force to compensate for the interruption of the drive force.

In the vehicle drive system of the present invention having the above feature, the internal combustion engine is configured to generate a drive force for driving the primary drive wheel of the vehicle, and the stepped variable transmission is configured to change the rotational speed of the output shaft of the internal combustion engine and output the changed rotational speed. The stepped variable transmission is a seamless-shift transmission configured such that a drive force to be transmitted therethrough is interrupted during the shifting down, but not substantially interrupted during the shifting up. The assist motor is configured to apply a drive force to the secondary drive wheel, or apply a drive force to the primary drive wheel without going through the stepped variable transmission, and the motor control device is configured to control a drive force from the assist motor. The motor control device is operable, during the shifting down by the stepped variable transmission, to cause the assist motor to generate a drive force to compensate for the interruption of the drive force.

According to this feature, the motor control device operates to cause the assist motor to generate a drive force to compensate for the drive force interruption during the shifting down, so that it is possible to suppress the "feeling of acceleration drop" which would otherwise be given to a passenger, thereby improving vehicle riding comfort. Here, a dual clutch transmission (DCT) has been known as a stepped variable transmission which is substantially free of occurrence of drive force interruption during speed stage shifting. However, the DCT has a structure in which two sets of torque transmission lines are switched by two clutches, so that the mechanism thereof becomes complicated, and the weight thereof becomes large. Thus, employing the DCT as a transmission gives rise to a problem of deterioration in vehicle mobility performance (acceleration performance, turning performance, etc.) due to the weight thereof, and increase in cost.

It is also conceivable to use a commonly-used stepped variable transmission in which a drive force is interrupted during speed stage shifting, in combination with an electric motor, wherein the drive force interruption during speed stage shifting is compensated for by a drive force of the electric motor. However, in order to compensate for the drive force interruption occurring in a commonly-used stepped variable transmission, it is necessary to use a large-output electric motor capable of instantaneously generating a large torque. This gives rise to a problem that the electric motor is increased in terms of weight and cost.

Comparing with this, a seamless-shift stepped variable transmission described in JP 5707119B can be constructed relatively lightly and can substantially eliminate drive force interruption during speed step shifting. Here, the seamless-shift stepped variable transmission described in this patent publication is capable of substantially eliminating drive force interruption during the shifting down or the shifting up. However, it is extremely difficult to produce a seamless-shift transmission capable of eliminating drive force interruption during both the shifting down and the shifting up.

The present inventor encountered the above problem has found that a large torque needs to compensate for drive force interruption occurring when a stepped variable transmission is shifted, in a normal traveling state, to the higher speed stage side (during up-shifting), whereas drive force interruption during the shifting to the lower speed stage side (down-shifting) can be compensated for by a relatively small drive force. Then, the present inventor has conceived of combining a seamless-shift transmission configured such that a drive force is not substantially interrupted during the shifting up, and a relatively small-size assist motor configured to compensate for the drive force interruption during the shifting down. This makes it possible to suppress the drive force interruption during speed stage shifting to provide good vehicle riding comfort, while avoiding deterioration in vehicle mobility performance due to a significant increase in vehicle weight, and significant increase in cost.

Preferably, the vehicle drive system of the present invention further comprises a primary drive motor provided on a vehicle body of the vehicle and configured to generate a drive force for the primary drive wheel, wherein the motor control device is configured to be capable of executing an electric motor-based traveling mode in which the vehicle is driven to travel based on drive forces generated by the primary drive motor and the assist motor, wherein the motor control device is operable, only when accelerating the vehicle at a given vehicle speed or more, in the electric motor-based traveling mode, to cause the assist motor to generate a drive force.

According to this feature, the vehicle drive system is equipped with the primary drive motor configured to generate a drive force for the primary drive wheel, so that it is possible to realize the electric motor-based traveling mode in which the drive force of the internal combustion engine is not used. This makes it possible to drive the vehicle to travel even in an area where traveling of the vehicle by the internal combustion engine is restricted. Further, when the vehicle is accelerated at a given vehicle speed or more, the motor control device operates to cause the assist motor to generate a drive force, so that it becomes possible to realize the electric motor-based traveling mode using a relatively small-size primary drive motor. This makes it possible to reduce the weight of the entire vehicle.

Preferably, in the vehicle drive system of the present invention, the assist motor is an in-wheel motor provided in the primary drive wheel or the secondary drive wheel.

According to this feature, the assist motor is an in-wheel motor. Thus, a generated drive force is directly transmitted to the drive wheel, so that it is possible to instantaneously add the drive force to the vehicle at a timing when the drive force interruption occurs. This makes it possible to more effectively suppress the feeling of acceleration drop which would otherwise be given to a passenger due to the drive force interruption.

Preferably, in the vehicle drive system of the present invention, the assist motor is provided to drive the secondary drive wheel, directly without changing a speed of a rotation output thereof.

According to this feature, the assist motor is configured to drive the secondary drive wheel, directly without changing the speed of the drive force output therefrom, so that it is possible to eliminate a need to provide a mechanism for changing the speed of the rotation output of the assist motor. This makes it possible to reduce the weight of the vehicle.

Preferably, in the vehicle drive system of the present invention, the motor control device is configured to be capable of executing an internal combustion engine-based traveling mode in which the vehicle is driven to travel based on a drive force generated by the internal combustion engine, wherein the motor control device is operable, in the internal combustion engine-based traveling mode, to inhibit the primary drive motor from generating a drive force.

According to this feature, in the internal combustion engine-based traveling mode, the primary drive motor does not generate any drive force, so that the vehicle is driven based on a drive force generated by the internal combustion engine. Thus, a driver can sufficiently enjoy a feeling of manipulation of the vehicle which is driven to travel based on the internal combustion engine.

Preferably, the vehicle drive system of the present invention further comprises a drive force transmitting mechanism for transmitting a drive force generated by the internal combustion engine, wherein the internal combustion engine is disposed in a front portion of the vehicle, and wherein the drive force generated by the internal combustion engine is transmitted to a rear wheel as the primary drive wheel, through the drive force transmitting mechanism.

According to this feature, the drive force generated by the internal combustion engine disposed in the front portion of the vehicle is transmitted to the rear wheel so as to drive the rear wheel, so that it is possible to enhance the vehicle mobility performance.

Effect of Invention

The vehicle drive system of the present invention is capable of, in a vehicle using a stepped variable transmission, suppressing the "feeling of acceleration drop" and the "feeling of free running" which would otherwise be given to a passenger during speed stage shifting, thereby improving the vehicle riding comfort.

DESCRIPTION OF EMBODIMENTS

With reference to accompanied drawings, a preferred embodiment of the present invention will now be described.

Figure 1:
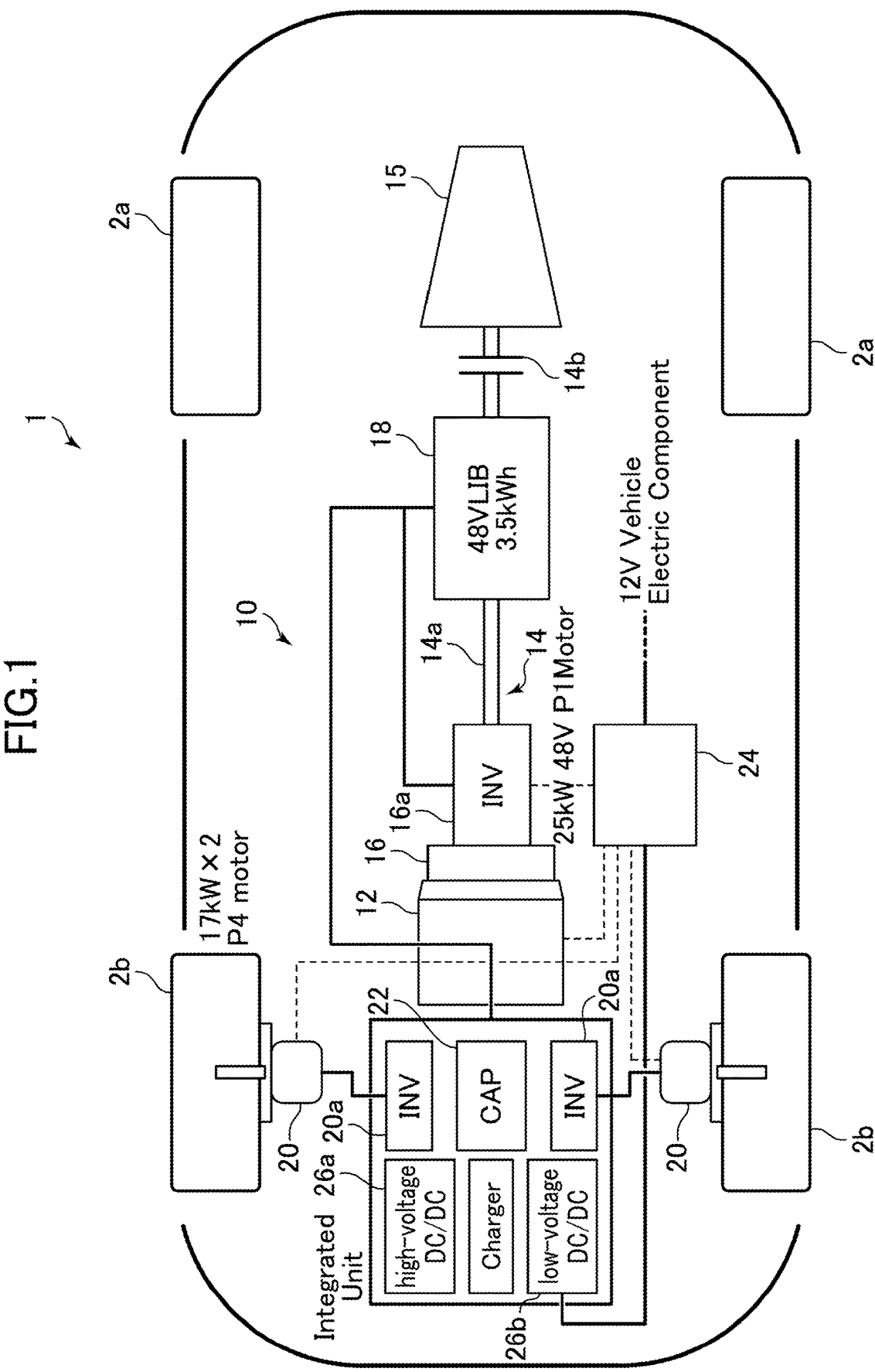
FIG. 1 is a layout diagram of a vehicle equipped with a vehicle drive system according to a first embodiment of the present invention.

FIG. 1 is a layout diagram of a vehicle equipped with a vehicle drive system according to a first embodiment of the present invention.

As shown in FIG. 1, the vehicle 1 equipped with the vehicle drive system according to the first embodiment is a so-called "FR (Front engine, Rear drive) vehicle" in which an engine 12 composed of an internal combustion engine is provided in a front portion of the vehicle at a position forward of a driver seat, and configured to drive a pair of right and left rear wheels 2a each serving as a primary drive wheel. As described later, the vehicle 1 is configured such that the rear wheels 2a are also driven by a primary drive motor, i.e., a primary drive electric motor, and a pair of right and left front wheels 2b each serving as a secondary drive wheel are driven, respectively, by two secondary drive motors, i.e., secondary drive electric motors.

The vehicle drive system 10 according to the first embodiment equipped in the vehicle 1 comprises: the engine 12 configured to drive the rear wheels 2a; a drive force transmitting mechanism 14 configured to transmit a drive force; a primary drive motor 16 configured to drive the rear wheels 2a; a battery 18 serving as an electric power accumulator; two secondary drive motors 20 each serving as an assist motor configured to drive a respective one of the front wheels 2b; a capacitor 22; and a controller 24 as a motor control device.

The engine 12 is an internal combustion engine for generating a drive force for the rear wheels 2a as the primary drive wheel of the vehicle 1. In this embodiment, an in-line 4-cylinder engine is employed as the engine 12, wherein the engine 12 is disposed in the front portion of the vehicle 1 and configured to drive the rear wheels 2a through the drive force transmitting mechanism 14.

The drive force transmitting mechanism 14 is configured to transmit a drive force generated by the engine 12 to the rear wheels 2a each serving as a primary drive wheel. The drive force transmitting mechanism 14 comprises a propeller shaft 14a connected to the engine 12, a clutch 14b, and a transmission 15 composed of a stepped variable transmission. The propeller shaft 14a is disposed to extend from the engine 12 disposed in the front portion of the vehicle 1 toward a rear end of the vehicle 1 through a propeller shaft tunnel (not illustrated). A rear end of the propeller shaft 14a is connected to the transmission 15 via the clutch 14b. An output shaft of the transmission 15 is connected to an axle (not illustrated) of the rear wheels 2a so as to drive the rear wheels 2a.

In this embodiment, as the transmission 15, a seamless-shift transmission is employed which is configured such that a drive force to be transmitted therethrough is interrupted during shifting to a lower speed stage side, but not substantially interrupted during shifting to a higher speed stage side. Further, in this embodiment, the transmission 15 is constructed as a so-called "rear transaxle arrangement". This allows the main body of the transmission having a large outer diameter to be removed from a position just behind the engine 12. Thus, the width of a floor tunnel (propeller shaft tunnel) can be reduced to ensure a central-side feet space of a passenger, so that it becomes possible to allow the lower body of the passenger to take an exactly forwardly-facing and bilaterally symmetric posture in a state in that the passenger sits on a seat. Further, it becomes easy to set the outer diameter and length of the primary drive motor 16 to sufficient values depending on an intended power output, while ensuring the above passenger's posture. The details of the transmission 15 will be described later.

The primary drive motor 16 is an electric motor for generating a drive force for the primary drive wheels, and disposed behind and in adjacent relation to the engine 12. Further, an inverter (INV) 16a is disposed in adjacent relation to the primary drive motor 16. Through the inverter 16a, a direct current from the battery 18 is converted into an alternating current, and the converted current is supplied to the primary drive motor 16. The primary drive motor 16 is connected in series with the engine 12, such that a drive force generated by the primary drive motor 16 is also transmitted to the rear wheels 2a through the drive force transmitting mechanism 14. Alternatively, the primary drive motor 16 may be connected to a halfway point of the drive force transmitting mechanism 14, such that the drive force is transmitted to the rear wheels 2a through a part of the drive force transmitting mechanism 14. In this embodiment, as the primary drive motor 16, a 25 kW permanent-magnetic electric motor (permanent magnet synchronous electric motor) is employed which is configured to be driven at 48 V.

The battery 18 is an electric power accumulator for accumulating electric power mainly for operating the primary drive motor 16. In this embodiment, the battery 18 is received in the propeller shaft tunnel (not illustrated). In this embodiment, a 48V, 3.5 kWh lithium-ion battery (LIB) is used as the battery 18.

In this embodiment, the rear transaxle arrangement is employed as mentioned above. Thus, a volume for receiving the battery 18 can be expanded toward a front-side space of the floor tunnel (propeller shaft tunnel) formed as a result of the rear transaxle arrangement. This makes it possible to ensure and expand the receiving volume of the battery 18 without narrowing the central-side space for a passenger due to an increase in width of the floor tunnel.

Each of the secondary drive motors 20 is provided in a respective one of the front wheels 2b as a so-called "unsprung portion" of the vehicle 1. In this embodiment, each of the front wheels 2b is supported by a double wishbone suspension, i.e., suspended on a vehicle body of the vehicle 1 through upper arms, lower arms, a spring, and a shock absorber (which are not illustrated). Each of the secondary drive motors 20 is an in-wheel motor (wheel motor), and received in a wheel body of a corresponding one of the front wheels 2b. That is, each of the secondary drive motors 20 is provided in the unsprung portion of the vehicle 1, and configured to drive a corresponding one of the front wheels 2b. As shown in FIG. 1, a direct current from the capacitor (CAP) 22 is converted into an alternating current through each of two inverters 20a, and the converted current is supplied from the inverters 20a to the secondary drive motors 20, respectively. Further, in this embodiment, no speed reducer is provided in each of the secondary drive motors 20, so that a drive forcer of the secondary drive motor 20 is directly transmitted to the front wheel 2b. In this embodiment, a 17 kW induction electric motor is employed as each of the secondary drive motors 20.

The capacitor (CAP) 22 is provided to accumulate regenerative electric power generated by the secondary drive motors 20. The capacitor 22 is disposed just in front of the engine 12, and configured to supply electric power to the secondary drive motors 20 each provided in a respective one of the front wheels 2b of the vehicle 1. The capacitor 22 is configured to accumulate electric charges at a voltage greater than that of the battery 18, and disposed within a region between the right and left front wheels 2b each serving as a secondary drive wheel. Each of the secondary drive motors 20 to be driven mainly by electric power accumulated in the capacitor 22 is driven at a voltage greater than that for the primary drive motor 16.

The controller 24 is configured to control the engine 12, the primary drive motor 16 and the secondary drive motors 20 to execute an electric motor-based traveling mode and an internal combustion engine-based traveling mode. The controller 24 is also configured to control the transmission 15 to change among a plurality of gear stages, and control the secondary drive motors 20 to compensate for drive force interruption due to the speed stage shifting. Specifically, the controller 24 may comprise a microprocessor, a memory, an interface circuit, and a program for operating them (which are not illustrated). The details of the controller will be described later.

Further, as shown in FIG. 1, a high-voltage DC/DC converter 26a and a low-voltage DC/DC converter 26b each serving as a voltage converter are arranged in the vicinity of the capacitor 22. The high-voltage DC/DC converter 26a, the low-voltage DC/DC converter 26b, the capacitor 22 and the inverters 20a are unitized to form an integrated unit.

Next, with reference to FIGS. 2 to 4, the configuration of a power source of the vehicle drive system 10 according to the first embodiment and a state of drive of the vehicle 1 by the motors will be described.

Figure 2:
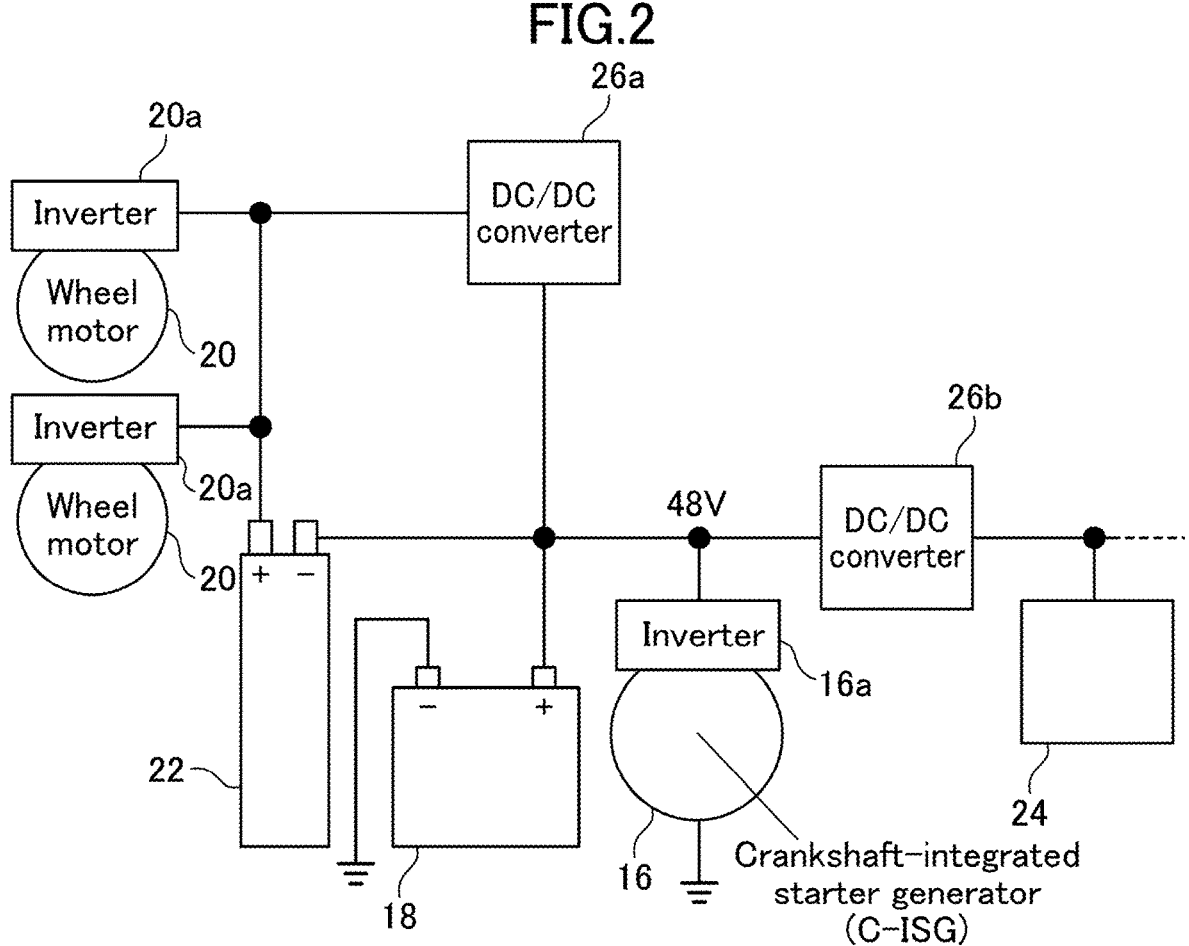
FIG. 2 is a block diagram showing the configuration of a power source of the vehicle drive system according to the first embodiment.

FIG. 2 is a block diagram showing the configuration of a power source of the vehicle drive system 10 according to the first embodiment. FIG. 3 is a chart schematically showing one example of a change in voltage when regenerative electric power is charged to the capacitor 22, in the vehicle drive system 10 according to the first embodiment. FIG. 4 is a chart showing a relationship between a vehicle speed and a power output of each of the motors used in the vehicle drive system 10 according to the first embodiment.

Firstly, the configuration of a power source of the vehicle drive system 10 according to the first embodiment will be described. As shown in FIG. 2, the battery 18 and the capacitor 22 provided in the vehicle drive system 10 are connected in series. The primary drive motor 16 is driven at about 48 V which is a reference output voltage of the battery 18, and each of the secondary drive motors 20 is driven at a voltage obtained by summing an output voltage of the battery 18 and an inter-terminal voltage (a voltage between terminals) of the capacitor 22, specifically, driven at a maximum voltage of 120 V which is greater than 48 V. Thus, the secondary drive motor 20 is always driven by electric power supplied through the capacitor 22.

The inverter 16a is attached to the primary drive motor 16, and configured to convert DC power output from the battery 10 into AC power so as to enable the primary drive motor 16 composed of the permanent-magnetic electric motor to be driven by the AC power. Similarly, the inverters 20a are attached, respectively, to the secondary drive motors 20, and configured to convert DC power output from the battery 18 and the capacitor 22 into AC power so as to enable the secondary drive motors 20 each composed of the induction electric motor to be driven by the AC power. Here, since each of the secondary drive motors 20 is driven at a voltage greater than that for the primary drive motor 16, a harness (not illustrated) for supplying electric power to the secondary drive motor 20 requires a high insulation property. However, an increase in weight of the harness due to the need to enhance the insulation property of the harness can be minimized, because each of the capacitors 22 is disposed in adjacent relation to a respective one of the secondary drive motors 20.

On the other hand, during deceleration or the like of the vehicle 1, each of the primary drive motor 16 and the secondary drive motors 20 functions as a generator to regenerate kinetic energy of the vehicle 1 so as to generate electric power. Regenerative electric power generated by the primary drive motor 16 is accumulated in the battery 18, and the regenerative electric power generated by the secondary drive motors 20 is accumulated in the capacitor 22.

The high-voltage DC/DC converter 26a serving as a voltage converter is connected between the battery 18 and the capacitor 22. This high-voltage DC/DC converter 26a is operable, when electric charges accumulated in the capacitor 22 is insufficient (when the inter-terminal voltage of the capacitor 22 drops), to raise the voltage of the battery 18 to charge the capacity 22. On the other hand, the high-voltage DC/DC converter 26a is operable, when the inter-terminal voltage of the capacitor 22 rises to a given voltage or more, according to energy regeneration by the secondary drive motors 20, to apply electric power to the battery 18 while reducing electric charges accumulated in the capacitor 22, to charge the battery 18. That is, regenerative electric power generated by the secondary drive motors 20 is accumulated in the capacitor, and then a part of accumulated electric charges are charged to the battery 18 through the high-voltage DC/DC converter 26a.

The low-voltage DC/DC converter 26b is connected between the battery 18 and a 12 V electric component of the vehicle 1. The controller 24 of the vehicle drive system 10 and most of electric components of the vehicle 1 operate at 12 V. The low-voltage DC/DC converter 26b is operable to reduce electric charges accumulated in the battery 18 to obtain a lowered voltage of 12 V, and supply the lowered voltage to the above components.

Next, with reference to FIG. 3, charging and discharging with respect to the capacitor 22 will be described.

Figure 3:
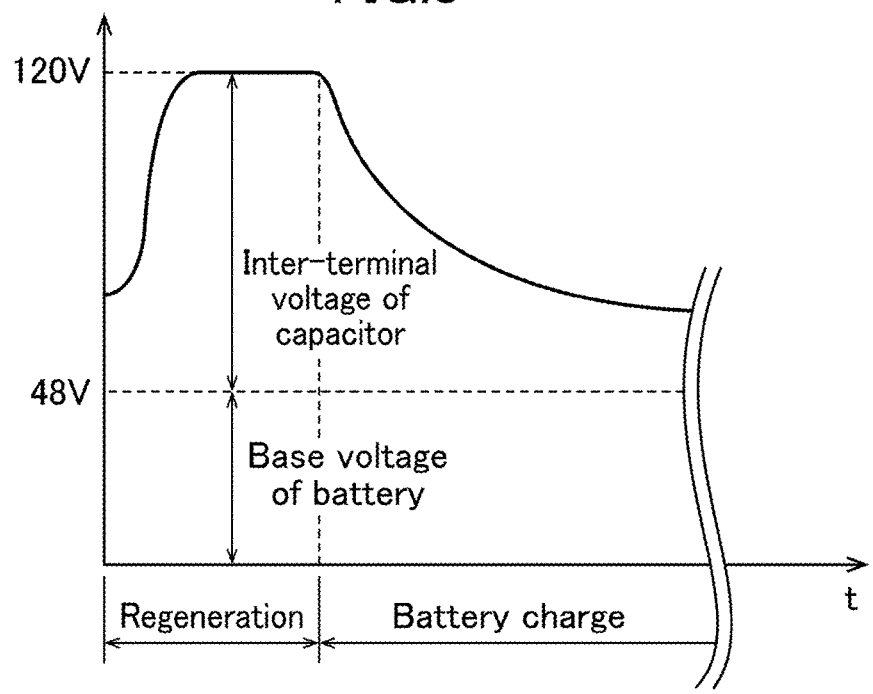
FIG. 3 is a chart schematically showing one example of a change in voltage when regenerative electric power is charged to a capacitor, in the vehicle drive system according to the first embodiment.

As shown in FIG. 3, the voltage of the capacitor 22 is a sum of a base voltage from the battery 18 and the inter-terminal voltage of the capacitor 22 itself. During deceleration or the like of the vehicle 1, generation of regenerative electric power is performed by the secondary drive motors 20, and the regenerative electric power is charged to the capacitor 22. In response to charging to the capacitor 22, the inter-terminal voltage rises relatively rapidly. When the voltage of the capacitor 22 rises to a given voltage or more as a result of the charging, the high-voltage DC/DC converter 26a operates to charge the battery 18 while lowering the voltage of the capacitor 22. As shown in FIG. 3, this charging from the capacitor 22 to the battery 18 is performed relatively gently as compared to the charging to the capacitor 22, so that the voltage of the capacitor 22 is lowered relatively gently to an adequate voltage.

That is, regenerative electric power generated by the secondary drive motors 20 is temporarily accumulated in the capacitor 22, and then gently charged to the battery 18. It should be noted here that, depending on a time period during which regeneration is performed, there is a possibility that the generation of regenerative electric power by the secondary drive motors 20 and the charging from the capacitor 22 to the battery 18 are performed in an overlapped manner.

On the other hand, regenerative electric power generated by the primary drive motor 16 is directly charged to the battery 18.

Next, with reference to FIG. 4, a relationship between a vehicle speed and a power output of each motor in the vehicle drive system 10 according to the first embodiment will be described. FIG. 4 is a chart showing the relationship between the vehicle speed of the vehicle 1 and the power output of each motor at each vehicle speed in the vehicle drive system 10 according to the first embodiment. In FIG. 4, a power output of the primary drive motor 16 is indicated by the broken line. Further, a power output of one of the secondary drive motors 20 and a total of power outputs of the two secondary drive motors 20 are indicated, respectively, by the one-dot chain lime and the two-dot chain line, and a total of power outputs of all the motors is indicated by the solid line.

Figure 4:
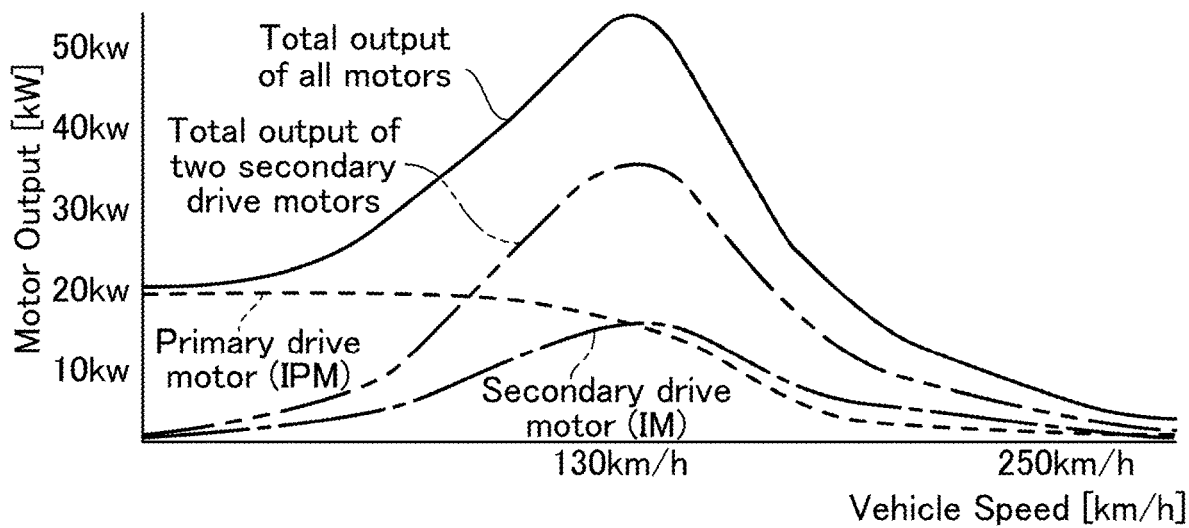
FIG. 4 is a chart showing a relationship between a vehicle speed and a power output of each motor used in the vehicle drive system according to the first embodiment.

Since, the permanent-magnetic electric motor is employed as the primary drive motor 16 in this embodiment, the power output of the primary drive motor 16 is relatively large in a low vehicle speed range where a motor speed thereof is relatively low, and an outputtable value of the power output of the primary drive motor 16 gradually decreases as the vehicle speed becomes higher, as indicated by the broken line in FIG. 4. That is, in this embodiment, the primary drive motor 16 is driven at about 48 V, wherein the primary drive motor 16 outputs a maximum torque of about 200 Nm until the motor speed thereof reaches about 1000 rpm, and, after the motor speed becomes greater than about 1000 rpm, the output torque gradually decreases along with an increase in the motor speed. In this embodiment, the primary drive motor 16 is configured to obtain a continuous power output of about 20 kW in the lowest motor speed range, and obtain a maximum power output of about 25 kW.

On the other hand, since the induction electric motor is employed as each of the secondary drive motors 20, the power output (total power output) of the secondary drive motor(s) 20 is extremely small in the low vehicle speed range, and gradually increases as the vehicle speed becomes higher to obtain the maximum power output at a vehicle speed of about 130 km/h, whereafter the power output (total power output) of the secondary drive motor(s) 20 gradually decreases, as indicated by the one-dot chain line and the two-dot chain line in FIG. 4. In this embodiment, each of the secondary drive motors 20 is configured to be driven at about 120 V, wherein, at a vehicle speed of about 130 km/h, a power output of about 17 kW is obtained in each of the secondary drive motors 20, and a power outputs of about 34 kW is obtained as a total power output of the two secondary drive motors 20. That is, in this embodiment, each of the secondary drive motors 20 has a torque curve in which a peak appears at a motor speed of about 600 to 800 rpm, and the maximum torque is obtained at about 200 Nm.

The total of the power outputs of the primary drive motor 16 and the two secondary drive motors 20 is indicated by the solid line in FIG. 4. As is evident from this graph, in this embodiment, a maximum power output of about 53 kW is obtained at a vehicle speed of about 130 km/h, and it is possible to satisfy a traveling condition required in the Worldwide Harmonized Light Vehicle Test Procedure (WLTP), by this maximum power output at this vehicle speed. It should be noted here that although the power outputs of the two secondary drive motors 20 are summed even in the low vehicle speed range as indicated by the solid line in FIG. 4, the secondary drive motors 20 are not actually driven in the low vehicle speed range. That is, when starting moving a vehicle and in the low vehicle speed range, the vehicle is driven only by the primary drive motor 16, and only when an relatively large power output is required in a high vehicle speed range (e.g., when the vehicle 1 is accelerated in the high vehicle speed range), the two secondary drive motors 20 generate power outputs. In this way, by using, only in the high vehicle speed region, the induction electric motors (secondary drive motors 20) capable of generating a relatively large power output in the high vehicle speed region, it is possible to obtain a sufficient power output when needed (e.g., during acceleration at a given vehicle speed or more), while keeping down an increase in vehicle weight.

Figure 5:
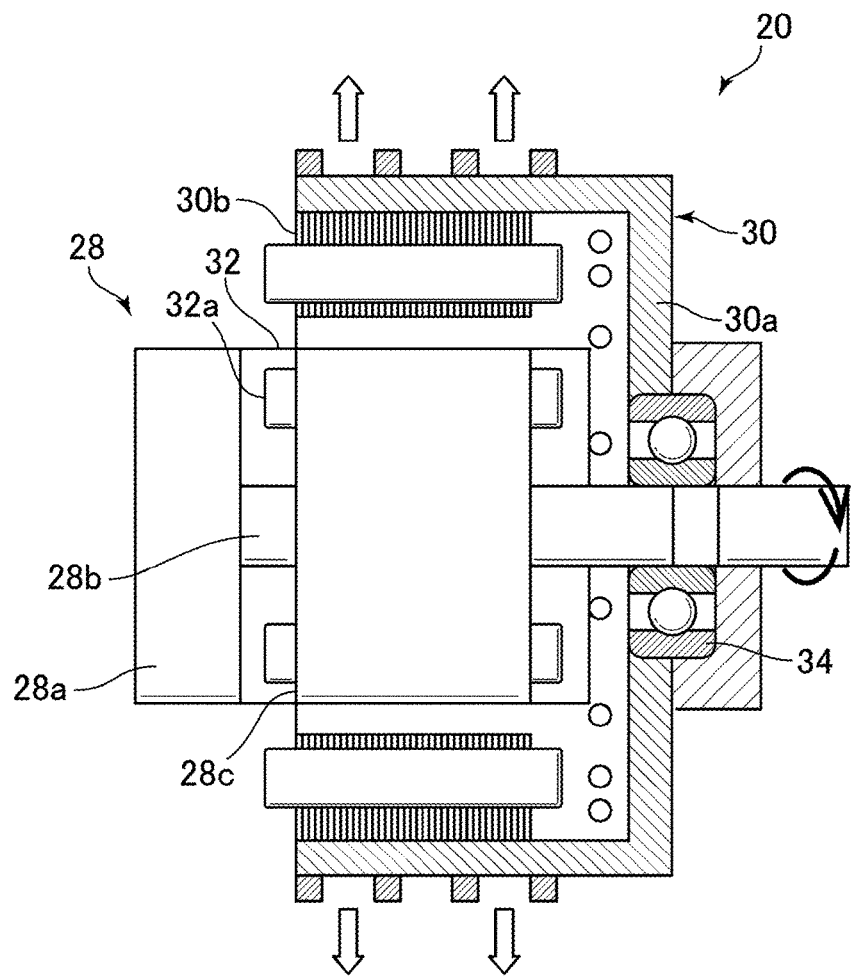
FIG. 5 is a sectional view schematically showing the structure of a secondary drive motor used in the vehicle drive system according to the first embodiment.

Next, with reference to FIG. 5, the configuration of each of the secondary drive motors 20 employed in the vehicle drive system 10 according to this embodiment will be described. FIG. 5 is a sectional view schematically showing the structure of the secondary electric drive motor 20.

As shown in FIG. 5, the secondary drive motor 20 is an outer rotor-type induction electric motor which comprises a stator 28, and a rotor 30 rotatable around the stator 28.

The stator 28 comprises: an approximately circular disk-shaped stator base 28a; a stator shaft 28b extending from the center of the stator base 28a; and a stator coil 28c attached around the stator shaft 28b. The stator coil 28c is housed in an electrically-insulating liquid chamber 32, such that it is immersed in electrically-insulating liquid 32a and subjected to ebullient cooling using the electrically-insulating liquid 32a.

The rotor 30 is formed in an approximately circular tube shape, such that it surrounds around the stator 28. The rotor 30 comprises a rotor body 30a formed in an approximately circular tube shape whose one end is closed, and a rotor coil 30b disposed on an inner peripheral wall of the rotor body 30a. The rotor coil 30b is disposed in opposed relation to the stator coil 28c, such that an inductive current is generated therein by a rotating magnetic field formed in the stator coil 28c. Further, the rotor 30 is supported by a bearing 34 attached to a distal end of the stator shaft 28b, such that it is smoothly rotated around the stator 28.

The stator base 28a is supported by the upper arm and the lower arm (not illustrated) suspending the front wheel of the vehicle 1. On the other hand, the rotor body 30a is directly fixed to the wheel body (not illustrated) of the front wheel 2b. An alternating current converted by the inverter 20a is supplied to the stator coil 28c to form a rotating magnetic field therein. This rotating magnetic field causes an inductive current to flow through the rotor coil 30b, thereby generating a drive force for rotating the rotor body 30a. The drive force generated by each of the secondary drive motors 20 in the above manner rotationally drives the wheel body (not illustrated) of a corresponding one of the front wheels 2b.

Next, with reference to FIG. 6, the configuration of the transmission 15 will be described.

Figure 6:
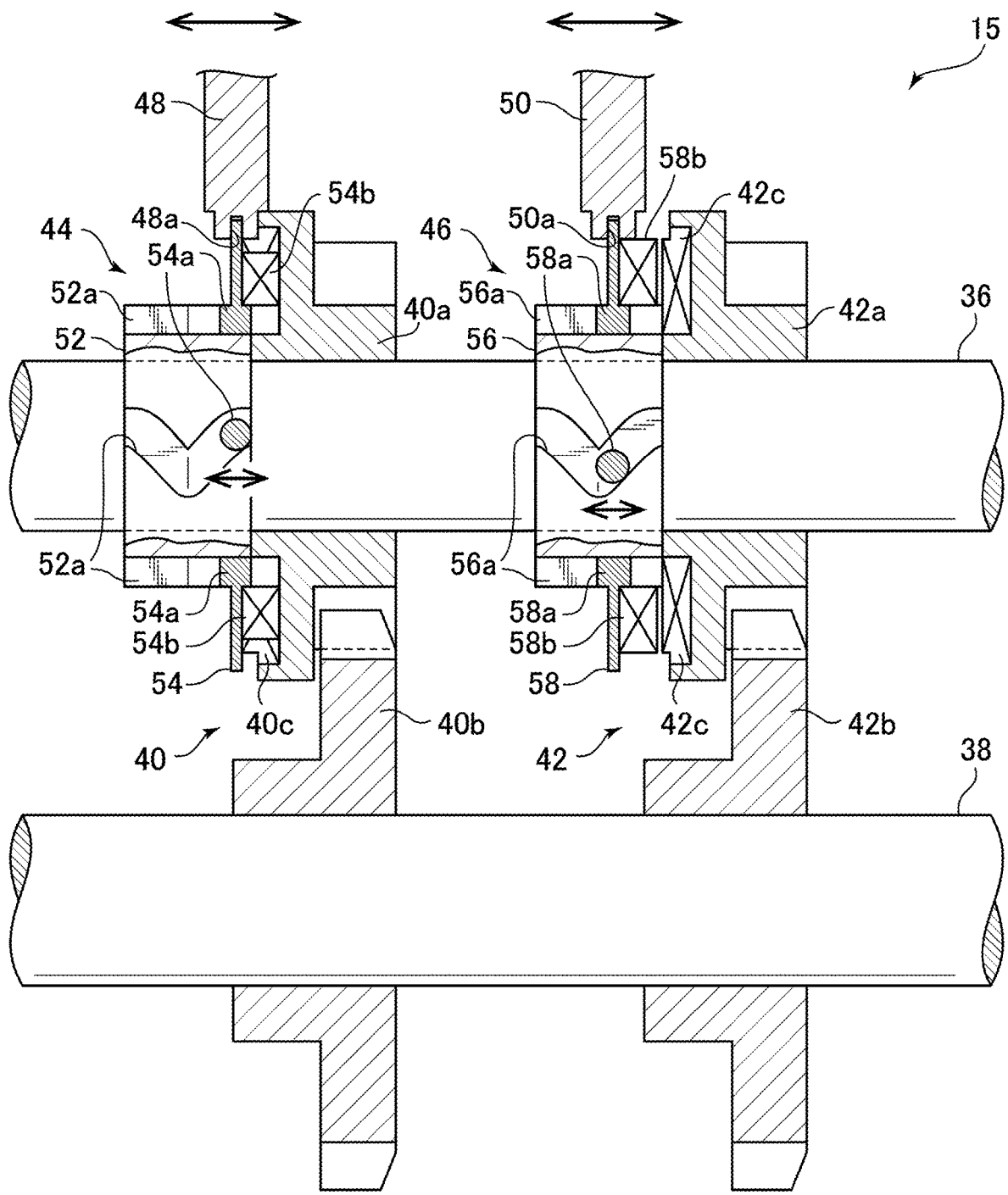
FIG. 6 is a sectional view for schematically explaining the principle of operation of a transmission provided in the vehicle drive system according to the first embodiment.

FIG. 6 is a sectional view for schematically explaining the principle of operation of the transmission 15 composed of a stepped variable transmission and provided in the vehicle drive system 10 according to the first embodiment. In this embodiment, the transmission 15 employed in the vehicle drive system 10 according to this embodiment is a 6-speed stepped variable transmission. Here, for the sake of simplicity, a mechanism for shifting from a certain low speed stage to a next higher speed stage and the function thereof will be exemplarily described. Based on the same configuration, shifting from a low speed stage side to a high speed stage side can be realized between any adjacent ones of the speed stages.

As shown in FIG. 6, the transmission 15 comprises: a main shaft 36 connected to an output shaft of the engine 12; a countershaft 38 serving as an output shaft of the transmission 15; a low speed-side gear set 40 (e.g., first speed gear set); and a high speed-side gear set 42 (e.g., second speed gear set) having a gear ratio less than that of the low speed-side gear set. The transmission 15 further comprises: a low speed-side dog clutch 44 provided in the main shaft 36; a high speed-side dog clutch 46; a first shift fork 48 for manipulating the low speed-side dog clutch 44; and a second shift fork 50 for manipulating the high speed-side dog clutch 50.

The main shaft 36 is an input shaft of the transmission 15, and is connected to the output shaft of the engine 12 while being rotatably supported with respect to a transmission casing (not illustrated) of the transmission 15. In this embodiment, the main shaft 36 is connected to the output shaft of the engine 12 through the propeller shaft 14a. Alternatively, the main shaft 36 may be directly connected to the output shaft of the engine 12.

The countershaft 38 is the output shaft of the transmission 1, and is rotatably supported with respect to the transmission casing (not illustrated). Rotation of the countershaft 38 is transmitted to a differential gear unit (not illustrated) disposed in a rear portion of the vehicle 1 to drive the rear wheels 2a serving as a primary drive wheels.

The low speed-side gear set 40 comprises a first gear 40a attached to the main shaft 36 and a second gear 40b attached to the countershaft 38, wherein the first and second gears 40a, 40b are always meshed with each other. The second gear 40b on the countershaft 38 is fixed to the countershaft 38, i.e., is configured to be always rotated together with the countershaft 38. On the other hand, the first gear 40a on the main shaft 36 is attached to the main shaft 36 in a freely rotatable manner (wherein the gear 40a is not slidable in an axial direction of the main shaft 36). The first gear 40a is configured to be capable of transmitting a drive force in a state in which it is fixed to the main shaft by the action of the low speed-side dog clutch 44.

Similarly, the high speed-side gear set 42 comprises a third gear 42a attached to the main shaft 36 and a fourth gear 42b attached to the countershaft 38, wherein the third and fourth gears 42a, 42b are always meshed with each other. The fourth gear 42b on the countershaft 38 is fixed to the countershaft 38, i.e., is configured to be always rotated together with the countershaft 38. On the other hand, the third gear 42a on the main shaft 36 is attached to the main shaft 36 in a freely rotatable manner, and configured to be capable of transmitting a drive force in a state in which it is fixed to the main shaft by the action of the high speed-side dog clutch 46.

The low speed-side dog clutch 44 comprises a clutch cam ring 52 fixed to the main shaft 36, and a clutch ring 54 attached to an outer periphery of the clutch cam ring 52.

The clutch cam ring 52 is a circular tube-shaped member, and is attached to an outer periphery of the main shaft 36, such that it is rotated integrally together with the main shaft 36. Further, an approximately axially-extending V-shaped cam groove 52a is provided plurally in an outer peripheral surface of the clutch cam ring 52 at even intervals in a circumferential direction of the main shaft 36.

The clutch ring 54 is a doughnut-shaped circular plate disposed on the outer periphery of the clutch cam ring 52, and is attached to the clutch cam ring 52 in an axially slidable manner with respect to the clutch cam ring 52. Further, the clutch ring 54 has a plurality of cross-sectionally circular-shaped cam protrusions 54a provided on an inner periphery thereof at even intervals in the circumferential direction and each protruding radially inwardly from an inner periphery thereof. The cam protrusions 54a are received in a respective one of the cam grooves 52a provided in the outer periphery of the clutch cam ring 52. Based on the above configuration, when the clutch ring 54 is slid in the axial direction, the clutch ring 54 is also moved in the circumferential direction along the V-shaped cam grooves 52a provided in the clutch cam ring 52.

Further, the clutch ring 54 has a plurality of clutch teeth 54a provided on one of opposite lateral surfaces thereof and each protruding in the axial direction. Specifically, the clutch teeth 54d are formed in a lateral surface of the clutch ring 54 opposed to the first gear 40a at even intervals to extend in a radial pattern. On the other hand, the first gear 40a has a plurality of clutch teeth 40c provided on a lateral surface thereof opposed to the clutch ring 54 at even intervals to extend in a radial pattern. The clutch teeth 40c of the first gear 40a and the clutch teen 54b of the clutch ring 54 are formed such that they are engaged with each other when the clutch ring 54 is slid in the axial direction toward the first gear 40a. In a state in which the clutch teeth 40c and the clutch teeth 54b are engaged with each other, rotation of the first gear 40a with respect to the main shaft 36 is stopped to enable the low speed-side gear set 40 (first and second gears 40a, 40b) to transmit a drive force therethrough. FIG. 6 shows a state in which the clutch ring 54 is slid to a position close to the first gear 40a, and the clutch teeth 40c and the clutch teeth 54b are engaged with each other.

An outer peripheral edge of the of the clutch ring 54 is received in a recess 48a provided at a distal end of the first shift fork 48. Thus, according to a movement of the first shift fork 48, the clutch ring 54 is slid in the axial direction on the clutch cam ring 52 to switch between engagement and disengagement between the clutch ring 54 and the first gear 40a.

The high speed-side dog clutch 46 has a configuration similar to that of the low speed-side dog clutch 44, i.e., comprises a clutch cam ring 56 fixed to the main shaft 36, and a clutch ring 58 attached to an outer periphery of the clutch cam ring 56.

The clutch cam ring 56 is a circular tube-shaped member, and an approximately axially-extending V-shaped cam groove 56a is provided plurally in an outer peripheral surface of the clutch cam ring 56 at even intervals in the circumferential direction.

The clutch ring 58 is a doughnut-shaped circular plate disposed on the outer periphery of the clutch cam ring 52, and has a plurality of cross-sectionally circular-shaped cam protrusions 58a provided on an inner periphery thereof at even intervals in the circumferential direction and each protruding radially inwardly from an inner periphery thereof. The cam protrusions 58a are received in a respective one of the cam grooves 56a provided in the outer periphery of the clutch cam ring 56, whereby, when the clutch ring 58 is slid in the axial direction, the clutch ring 58 is also moved in the circumferential direction along the V-shaped cam grooves 56a.

Further, the clutch ring 58 has a plurality of clutch teeth 58b provided on one of opposite lateral surfaces thereof and each protruding in the axial direction. On the other hand, the third gear 42a has a plurality of clutch teeth 42c provided on a lateral surface thereof opposed to the clutch ring 58 at even intervals to extend in a radial pattern. The clutch teeth 42c of the third gear 42a and the clutch teen 58b of the clutch ring 58 are formed such that they are engaged with each other, and, in the engaged state, rotation of the third gear 42a with respect to the main shaft 36 is stopped to enable the high speed-side gear set 42 (third and fourth gears 42a, 42b) to transmit a drive force therethrough. FIG. 6 shows a state in which the clutch ring 58 is slid to a position away from the third gear 42a, and the engagement between the clutch teeth 42c and the clutch teeth 58b are released.

An outer peripheral edge of the of the clutch ring 58 is received in a recess 50a provided at a distal end of the second shift fork 50. Thus, according to a movement of the second shift fork 50, the clutch ring 58 is slid in the axial direction on the clutch cam ring 54 to switch between engagement and disengagement between the clutch ring 58 and the third gear 42a. That is, according to respective movements of the first and second shift forks 48, 50, the engagement and disengagement between the clutch ring 54 and the first gear 40a and between the clutch ring 58 and the third gear 42a are switched. In this way, the drive force transmission through the low speed-side gear set 40 (first and second gears 40a, 40b) and the drive force transmission through the high speed-side gear set 42 (third and fourth gears 42a, 42b) are switched.

Each of the first and second shift fork 48, 50 is provided to be movable in the axial direction of the main shaft 36 (horizontal direction in FIG. 6) along a respective one of two grooves (not illustrated) provided in an outer peripheral surface of a cylindrical shift drum (not illustrated). Thus, when the shift drum (not illustrated) is rotated by an actuator (not illustrated), each of the first and second shift fork 48, 50 is moved in a given pattern according to a corresponding one of the grooves formed on the shift drum (not illustrated) to switch the gear engagement state.

Next, speed stage shifting in the transmission 15 will be described.

The speed stage shifting in the transmission 15 is automatically performed such that the controller 24 controls the actuator (not illustrated) to rotate the shift drum (not illustrated) to move each of the shift forks. The transmission 15 is configured to be operated in a mode in which one of the speed stage is automatically selected and set by the controller 24 according to the engine speed of the engine 12, the vehicle speed of the vehicle 1, etc. (automatic mode) or in a mode in which one of the speed stage is manually selected by a driver (manual mode).

As mentioned above, FIG. 6 shows the state in which a drive force is transmitted through the low speed-side gear set 40, and the third gear 42a of the high speed-side gear set 42 is freely rotated with respect to the main shaft 36. In a case where the state in which a drive force is transmitted through the low speed-side gear set 40 is shifted to a state in which a drive force is transmitted through the high speed-side gear set 42 (up-shifting), the first and second shift forks 48, 50 are moved, respectively, along the grooves provided on the shift drum (not illustrated). That is, when shifting the transmission 15 to a higher speed stage side, the first shift fork 48 is moved away from the first gear 40a, and the second shift fork 50 is moved close to the third gear 42a.

First of all, in the state in which a drive force is transmitted through the low speed-side gear set 40, the clutch teeth 54b of the clutch ring 54 and the clutch teeth 40c of the first gear 40a are engaged with each other. In this state, the main shaft 36, the first gear 40a, the clutch cam ring 52 and the clutch ring 54 are rotated integrally at exactly the same rotational speed. Then, in order to shift the transmission 15 to the higher speed stage side, the clutch ring 58 of the high speed-side dog clutch 46 is moved toward the third gear 42a by the second shift fork 50. Thus, the clutch teeth 58a of the clutch ring 58 and the clutch teeth 42c of the third gear 42c are brought into contact with each other, so that a drive force is also transmitted through the high speed-side gear set 42. Thus, a rotational speed of each of the main shaft 36 and the countershaft 38 slightly changes.

This change in rotational speed causes a slight difference in rotational speed between the clutch cam ring 52 and the clutch ring 54. Based on this difference in rotational speed, an inclined surface of the V-shaped cam groove 52a formed on the clutch cam ring 52 presses the cam protrusions 54a of the clutch ring 54. A component of the pressing force of the inclined surface of the cam groove 52a against the cam protrusions 54a is applied in a direction causing the clutch teeth 54d to be disengaged from the clutch teeth 40c and causing the clutch ring 54 to be moved away from the first gear 40a. Further, the clutch teeth 58 of the clutch ring 58 and the clutch teeth 42c of the third gear 42a are engaged with each other, so that a drive force is transmitted through the high speed-side gear set 42.

In this way, the release of the engagement between the clutch ring 54 and the first gear 40a based on the movement of the first shift fork 48, and the engagement between the clutch ring 58 and the second gear 42a based on the movement of the second shift fork 50 are approximately simultaneously performed. Therefore, shifting from the low speed-side gear set 40 to the high speed-side gear set 42 is instantaneously performed to complete the shifting to the high speed stage side in a state substantially free of drive force interruption.

In FIG. 6, a gear to be selectively engaged is disposed on only one side of each of the clutch rings. Alternatively, the transmission may be configured such that clutch teeth are provided on both sides of each of the clutch rings, and a gear to be selectively engaged is disposed on both sides of each of the clutch rings. This makes it possible to provide a large number of speed stages in a compact configuration.

Figure 7:
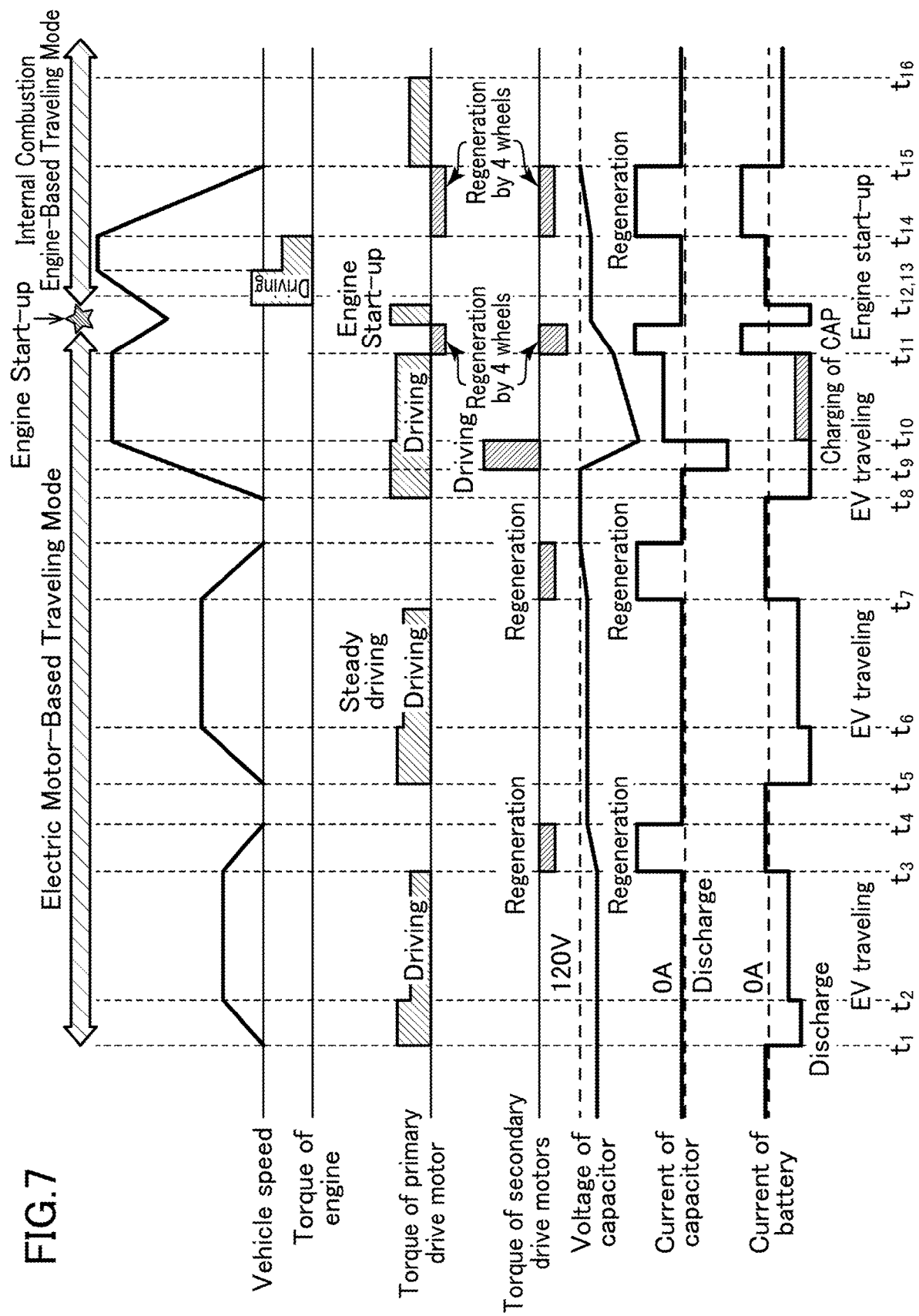
FIG. 7 is a time chart showing one example of operations in an electric motor-based traveling mode and an internal combustion engine-based traveling mode to be executed by a control device, in the vehicle drive system according to the first embodiment.

Next, with reference to FIG. 7, operations of the electric motor-based traveling mode and the internal combustion engine-based traveling mode to be executed by the controller 24 will be described. FIG. 7 is a time chart showing one example of operations in the two modes.

The time chart of FIG. 7 shows the vehicle speed of the vehicle 1, the torque generated by the engine 12, the torque generated by the primary drive motor 16, the torque generated by the secondary drive motors 20, the voltage of the capacitor 22, the current of the capacitor 22, and the current of the battery 18, in this order from the upper side of the drawing sheet. In charts indicating the torque of the primary drive motor 16 and the torque of the secondary drive motors 20, a positive value means a state in which each of the motors is generating a torque, and a negative value means a state in which each of the motors is regenerating kinetic energy of the vehicle 1. Further, In charts indicating the current of the capacitor 22 and the current of the battery 18, a negative value means a state in which each of the motors is supplying (discharging) regenerative electric power, and a positive value means a state in which each of the motors is charging regenerative electric power.

First of all, in FIG. 7, at time $t_1$, a driver starts moving the vehicle 1 and accelerates the vehicle 1, in the electric motor-based traveling mode. In this state, the primary drive motor 16 generates a torque, and the vehicle speed is increased (in a time period between times $t_1$ to $t_2$ in FIG. 10). During this process, a discharging current flows from the battery 18b supplying electric power to the primary drive motor 16, whereas the secondary drive motors 20 is kept from generating torque, so that a discharging current from the capacitor 22 is maintained at zero, and the voltage of the capacitor 22 is not changed. Further, in the time period between the times $t_1$ to $t_2$, the traveling mode is set to the electric motor-based traveling mode, so that the engine 12 is not driven (no fuel is supplied to the engine 12, and thus no torque is generated by the engine 12).

In the example shown in FIG. 7, after the vehicle 1 is accelerated in the time period between the times $t_1$ to $t_2$, the vehicle 1 is driven to travel at a constant vehicle speed, until time $t_3$. Then, when the driver manipulates a brake pedal (not illustrated) of the vehicle 1 at the time $t_3$, driving by the primary drive motor 16 is stopped (no torque is generated by the primary drive motor 16), and kinetic energy of the vehicle 1 is regenerated as electric power by the secondary drive motors 20. Due to the regeneration of kinetic energy, the vehicle 1 is decelerated, and the discharging current from the battery 18 becomes zero. On the other hand, due to generation of regenerative electric power by the secondary drive motors 20, a charging current flows to the capacitor 22, and the voltage of the capacitor 22 is increased.

In FIG. 7, when the vehicle 1 is stopped at time $t_4$, the charging current to the capacitor 22 becomes zero, and the voltage of the capacitor 22 becomes constant. Subsequently, the vehicle 1 is driven to start moving again at time $t_5$, and reaches low vehicle speed traveling (time $t_6$). Then, when deceleration of the vehicle 1 is started (time $t_7$), generation of regenerative electric power is performed by the secondary drive motors 20. As above, when staring moving and stopping are repeated at a relatively low vehicle speed in an urban area or the like, the traveling mode is set to the electric motor-based traveling mode in which the vehicle 1 purely functions as an electric vehicle (EV), i.e., no torque is generated by the engine 12.

Further, in FIG. 7, when the vehicle 1 is driven to start moving at time $t_5$, the vehicle 1 is accelerated. Subsequently, when the vehicle speed of the vehicle 1 exceeds a given vehicle speed at time $t_9$, the secondary drive motors 20 are also driven. As above, when the vehicle 1 being traveling at a given vehicle speed or more is accelerated at a given acceleration or more in the electric motor-based traveling mode, electric power is supplied to the primary drive motor 16 and the secondary drive motors 20 to drive the vehicle 1 by these motors so as to obtain a required drive force. In this process, the primary drive motor 16 is supplied with eclectic power from the battery 18, and the secondary drive motors 20 are supplied with eclectic power from the capacitor 22. As a result of supplying electric power from the capacitor 22 in the above manner, the voltage of the capacitor 22 is lowered.

In FIG. 7, when the vehicle 1 transitions to traveling at a constant vehicle speed (when the amount of manipulation of an accelerator pedal becomes less than a given value) at time $t_{10}$, the driving by the secondary drive motors 20 is stopped (no torque is generated by the secondary drive motors 20), and the vehicle 1 is driven only by the primary drive motor 16. As above, when the vehicle 1 is not accelerated at the given acceleration or more even in the state in which the vehicle 1 is traveling at the given vehicle speed or more, the vehicle 1 is driven only by the primary drive motor 16.

Further, the voltage of the capacitor 22 is lowered to a given value or less due to the driving of the secondary drive motors 20 in the time period between the times $t_9$ to $t_{10}$. Thus, at the time $t_{10}$, the controller 24 operates to send a signal to the high-voltage DC/DC converter 26a to charge the capacitor 22. Specifically, the high-voltage DC/DC converter 26a charges the capacitor 22 while increasing electric charges accumulated in the battery 18. Thus, in a time period between times $t_{10}$ to $t_{11}$ in FIG. 7, a current for driving the primary drive motor 16 and a current for charging the capacitor 22 are discharged from the battery 18. Here, when large regenerative electric power is generated by the secondary drive motors 20 and thus the voltage of the capacitor 22 is increased to a given value or more, the controller 24 operates to send a signal to the high-voltage DC/DC converter 26a to charge the battery 18 while lowering the voltage of the capacitor 22. As above, regenerative electric power generated by the secondary drive motors 20 is consumed by the secondary drive motors 20, or is accumulated in the capacitor 22 once and then charged to the battery 18 through the high-voltage DC/DC converter 26a.

In FIG. 7, when the vehicle 1 is decelerated (a brake pedal is manipulated) at the time $t_{11}$, kinetic energy of the vehicle 1 is regenerated as regenerative electric power by both the primary drive motor 16 and the secondary drive motors 20. Regenerative electric power generated by the primary drive motor 16 is accumulated in the battery 18, and Regenerative electric power generated by the secondary drive motors 20 is accumulated by the capacitor 22. As above, when the brake pedal is manipulated at the given vehicle speed or more, regenerative electric power is generated by both the primary drive motor 16 and the secondary drive motors 20, and resulting electric charges are accumulated in the battery 18 and the capacitor 22.

Then, in FIG. 7, at time $t_{12}$, the driver manipulates a switch (not illustrated) to switch the traveling mode of the vehicle 1 from the electric motor-based traveling mode to the internal combustion engine-based traveling mode, and depresses the accelerator pedal (not illustrated). When the traveling mode of the vehicle 1 is switched to the internal combustion engine-based traveling mode, supply of fuel to the engine 12 is initiated, so that the engine 12 starts to generate a torque. Specifically, in this embodiment, the output shaft (not illustrated) of the engine 12 is directly connected to an output shaft (not illustrated) of the primary drive motor 16, so that the output shaft of the engine 12 is always rotated in conjunction with driving of the primary drive motor 16. However, in the electric motor-based traveling mode, no fuel is supplied to the engine 12, and therefore no torque is generated by the engine 12. The engine 12 can generate a torque only after the fuel supply is initiated in the internal combustion engine-based traveling mode.

Further, just after the traveling mode is switched from the electric motor-based traveling mode to the internal combustion engine-based traveling mode, the controller 24 operates to cause the primary drive motor 16 to generate an engine starting torque (in a time period between times $t_{12}$ to $t_{13}$ in FIG. 17). This engine starting torque is generated to enable the vehicle 1 to travel in a time period after initiation of the fuel supply to the engine 12 through until the engine 12 actually generate a torque, and suppress variation in torque before an after the torque generation by the engine 12. Further, in this embodiment, the fuel supply to the engine 12 is not initiated in a situation where the engine speed of the engine 12 is less than a given value at a time when the traveling mode is switched to the internal combustion engine-based traveling mode, but initiated at a time when the engine speed of the engine 12 is increased to the given value or more by the engine starting torque. Specifically, in this embodiment, the fuel supply is initiated when the engine speed of the engine 12 is increased to 2000 rpm or more.

After start-up of the engine 12, in the internal combustion engine-based traveling mode, a drive force for driving the vehicle 1 is entirely output from the engine 12, and the primary drive motor 16 and the secondary drive motors 20 never output a drive force for driving the vehicle 1. Thus, the driver can enjoy a feeling of manipulation of the vehicle 1 which is driven by the internal combustion engine.

Subsequently, when the driver manipulates the brake pedal (not illustrated) at time $t_{14}$ in FIG. 7, the fuel supply to the engine 12 is stopped to suppress fuel consumption. Further, kinetic energy of the vehicle 1 is regenerated as electric energy by the primary drive motor 16 and the secondary drive motors 20, and a charging current flows to the battery 18 and the capacitor 22.

In a situation where the vehicle 1 is being decelerated in the internal combustion engine-based traveling mode, the controller 24 operates to drive the secondary drive motors 20 during shifting (speed stage shifting) of the transmission 15 composed of a stepped variable transmission, to execute torque adjustment control. A torque to be generated by this torque adjustment control is intended to instantaneously compensate for torque drop or the like, but does not fall under the same category of a torque for driving the vehicle 1. The details of the torque adjustment control will be described later.

On the other hand, in FIG. 1, when the vehicle 1 is stopped at time $t_{15}$, the controller 24 operates to supply a minimum amount of fuel necessary to maintain an idling operation of the engine 12. Further, the controller 24 operates to cause the primary drive motor 16 to generate an assist torque so as to enable the engine 12 to maintain the idling operation at a low engine speed.

In this embodiment, although the engine 12 is a flywheel-less engine, the assist torque generated by the primary drive motor 16 acts as a quasi-flywheel, so that the engine 12 can maintain a smooth idling operation at a low engine speed. In addition, by employing the flywheel-less engine, it is possible to obtain a high responsiveness of the engine 12 during traveling in the internal combustion engine-based traveling mode, whereby the driver can enjoy good feeling of vehicle manipulation.

Further, when the vehicle 1 is driven to start moving from a stopped state in the internal combustion engine-based traveling mode, the controller 24 operates to send a signal to the primary drive motor 16 to increase the rotational speed of the primary drive motor 16 (=the engine speed of the engine 12) to a given value. After the engine speed is increased to the given value, the controller 24 operates to supply engine driving fuel to the engine 12 to cause the engine 12 to generate a drive force so as to enable traveling in the internal combustion engine-based traveling mode.

Next, with reference to FIGS. 8 to 10, a change in acceleration of the vehicle during shifting (speed stage shifting) of the transmission 15 will be described.

Figure 8:
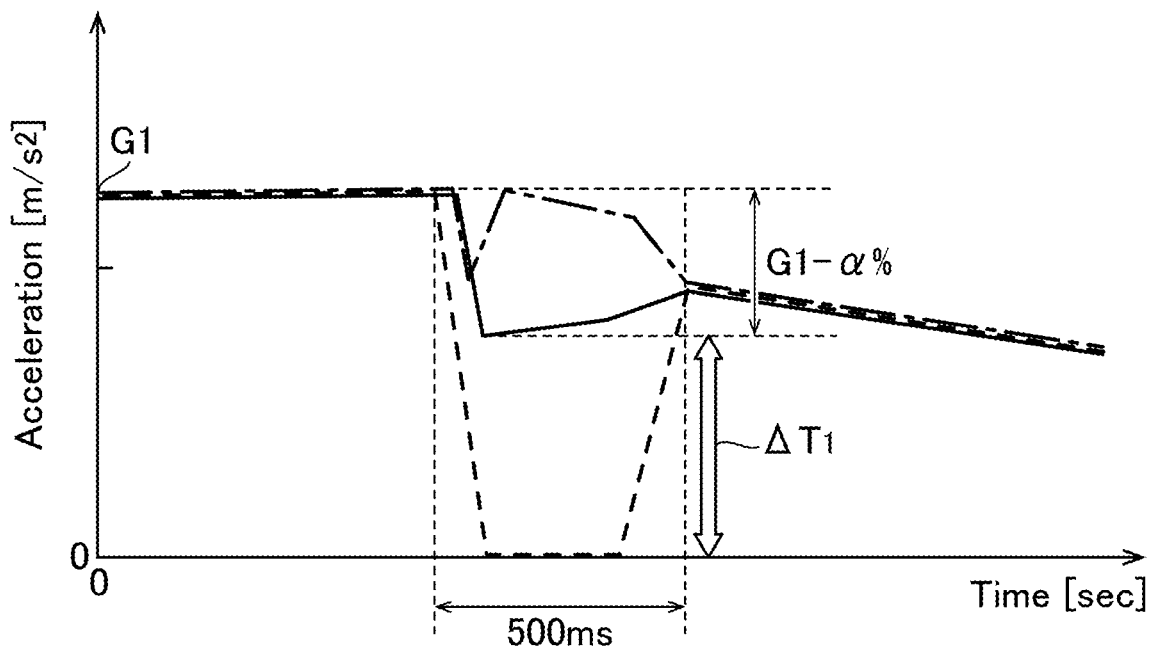
FIG. 8 is a graph schematically showing a vehicle acceleration when a transmission is up-shifted, in the vehicle drive system according to the first embodiment.

FIG. 8 is a graph schematically showing the acceleration of the vehicle 1 when the transmission 15 is shifted to the higher speed stage side (up-shifted), wherein the horizontal axis represents time [sec], and the vertical axis represents acceleration [m/s$^2$]. Similarly, FIGS. 9 and 10 are graphs each schematically showing the acceleration of the vehicle 1 when the transmission 15 is shifted to the lower speed stage side (down-shifted), wherein the horizontal axis represents time [sec], and the vertical axis represents acceleration [m/s$^2$].

Firstly, FIG. 8 shows a change in acceleration of the vehicle 1 when the transmission 15 is shifted from a first speed stage to a second speed stage in a state in which the accelerator pedal (not illustrated) of the vehicle 1 is depressed maximally. Here, in the example shown in FIG. 8, the acceleration of the vehicle 1 before the speed stage shifting is G1 [m/s$^2$]. In a conventional so-called auto shift manual (ASM)-type transmission configured to automatically shift a stepped manual automatic transmission by an actuator, the speed storage shifting requires a time period of about 300 to 800 [msec] (in the example in FIG. 8, about 500 [msec]), as indicated by the broken line in FIG. 8. In this time period, the vehicle acceleration is lowered to about 0G, which gives a passenger the "feeling of acceleration drop", causing discomfort.

Comparing this, in an automatic transmission equipped with a torque converter, drop of the acceleration during shifting from the first speed stage to the second speed stage is extremely small, as indicated by the one-dot chain line in FIG. 8, so that a passenger never has the "feeling of acceleration drop".

Further, in this embodiment, a seamless-shift transmission configured such that a drive force is not substantially interrupted during the shifting to the higher speed stage side is employed as the stepped variable transmission 15, so that lowering of the acceleration during the speed stage shifting is suppressed, as indicated by the solid line in FIG. 8. Specifically, in this embodiment, an amount of the acceleration drop during the speed stage shifting is reduced to α % or less with respect to the acceleration G1 before the speed stage shifting. This acceleration drop during the speed stage shifting, i.e., about α %, is sufficient to fulfill performance of a sporty vehicle, and is almost free from giving a passenger the "feeling of acceleration drop".

It is conceivable to suppress the acceleration drop as indicated by the broken line in FIG. 8 in the conventional auto shift manual-type transmission, by using a drive force of an electric motor. In this case, in order to reduce the acceleration drop as indicated by the broken line in FIG. 8, to the level of the acceleration drop as indicated by the solid line in the vehicle drive system 10 according to this embodiment, it is necessary to instantaneously compensate by a torque of about ΔT1 [Nm]. This motor torque ΔT1 necessary for the compensation is a large value equal to a torque necessary for an electric vehicle to travel by a single motor, so that a large-size motor is required for the compensation, thereby leading to a significant increase in weight.

Figure 9:
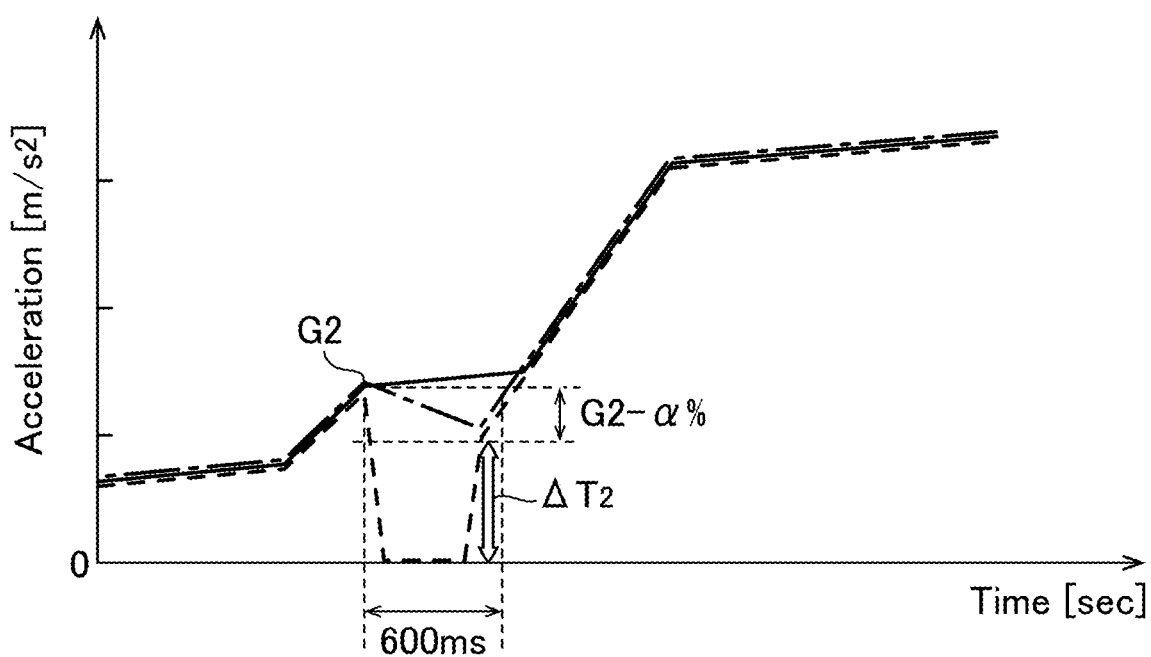
FIG. 9 is a graph schematically showing a vehicle acceleration when the transmission is down-shifted, in the vehicle drive system according to the first embodiment.

Secondly, FIG. 9 shows a change in acceleration of the vehicle 1 when the transmission 15 is shifted from a third speed stage to the second speed stage in a state in which the accelerator pedal (not illustrated) of the vehicle 1 is depressed. Specifically, in FIG. 9, in a situation where the accelerator pedal (not illustrated) of the vehicle 1 is depressed to accelerate the vehicle 1 from a given vehicle speed, such that the degree of depression of the accelerator pedal increases at a given rate, the transmission 15 is shifted to the lower speed stage side (down-shifted).

Here, in the example shown in FIG. 9, the acceleration of the vehicle 1 before the speed stage shifting is G2 [m/s$^2$]. In the conventional auto shift manual-type transmission, the speed storage shifting requires a time period of about 300 to 1000 [msec] (in the example in FIG. 9, about 600 [msec]), as indicated by the broken line in FIG. 9. In this time period, the vehicle acceleration is lowered to about 0G, which gives a passenger the "feeling of acceleration drop", causing discomfort.

Comparing this, in the automatic transmission equipped with a torque converter, drop of the acceleration during shifting from the third speed stage to the second speed stage is extremely small, as indicated by the one-dot chain line in FIG. 9, so that a passenger never has the "feeling of acceleration drop".

Here, in this embodiment, although the seamless-shift transmission is employed as the stepped variable transmission 15, drive force interruption occurs during the shifting to the lower speed stage side (down-shifting). Therefore, in this embodiment, during the shifting to the lower speed stage side, the controller 24 operates to send a signal to the secondary drive motors 20 to generate a drive force, thereby compensating for the drive force drop (interruption). Specifically, in this embodiment, during the shifting of the transmission 15 to the lower speed stage side, the secondary drive motors 20 are controlled to generate a drive force to compensate for the drive force interruption during the speed stage shifting, as indicated by the solid line in FIG. 9, thereby preventing acceleration drop. This makes it possible to obtain sufficient performance as a sporty vehicle, and become free from giving a passenger the "feeling of acceleration drop".

As above, in this embodiment, the same level of acceleration drop as that of the auto shift manual-type transmission as indicated by the broken line in FIG. 9 is compensated for by a drive force of the secondary drive motors 20. Here, a torque necessary to reduce the acceleration drop to α % or less with respect to the acceleration G2 before the speed stage shifting is ΔT2 [Nm]. This torque ΔT2 is sufficiently smaller than the torque required during the shifting to the higher speed stage side as exemplified in FIG. 8, so that the acceleration drop can be effectively compensated for by the relatively small-size secondary drive motors 20.

Further, in this embodiment, drive force interruption in the primary drive wheels (rear wheels 2a) is compensated for by the secondary drive wheels (front wheels) using the secondary drive motors 20 which are in-wheel motors. Thus, it is possible to compensate for the drive force interruption with a high responsiveness, without receiving an influence of dynamic properties of the drive force transmitting mechanism 14 for transmitting a drive force to the primary drive wheels. The drive force from the secondary drive motors 20 during the shifting of the transmission 15 to the lower speed stage side is generated for a significantly short time period, but is not substantially at a level capable of driving the vehicle 1. Therefore, a drive force to be generated by the secondary drive motors 20 can be produced by electric charges regenerated by the secondary drive motors 20 and accumulated in the capacitor 22.

Figure 10:
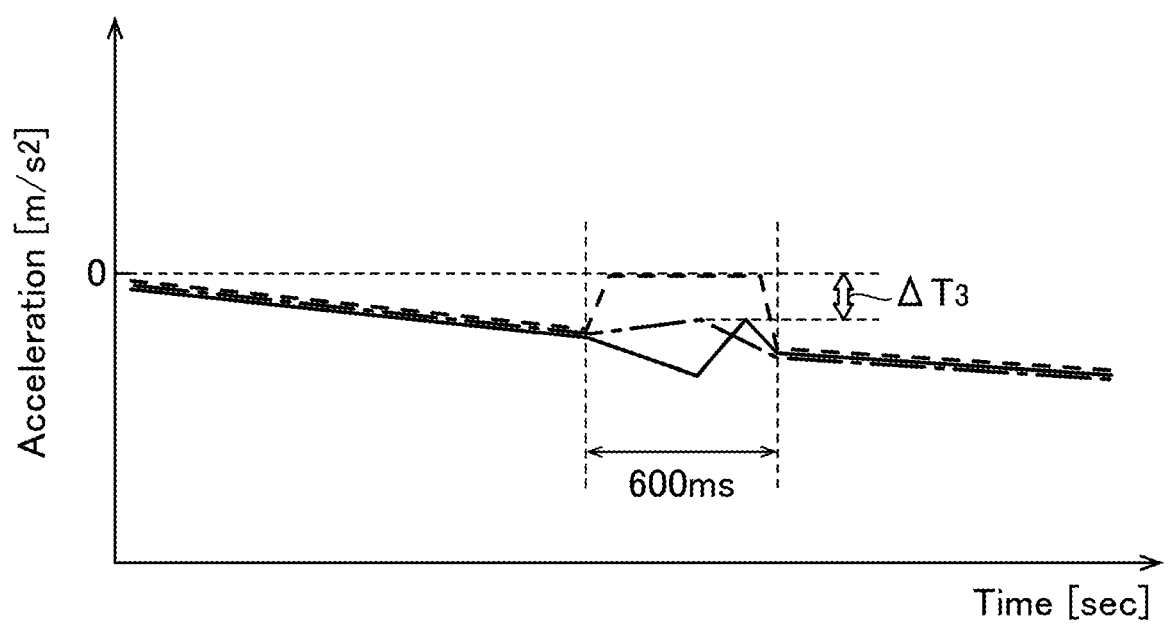
FIG. 10 is a graph schematically showing a vehicle acceleration when the transmission is down-shifted, in the vehicle drive system according to the first embodiment.

Thirdly, FIG. 10 shows a change in deceleration of the vehicle 1 when the transmission 15 is shifted from the third speed stage to the second speed stage in a state in which the accelerator pedal (not illustrated) of the vehicle 1 is not depressed, and the vehicle 1 is decelerated by engine brake. In the example shown in FIG. 10, the acceleration of the vehicle 1 before the speed stage shifting is less than 0, and, in this state, the transmission 15 is shifted to the lower speed stage side. In the conventional auto shift manual-type transmission, the speed storage shifting requires a time period of about 300 to 1000 [msec] (in the example in FIG. 10, about 600 [msec]), as indicated by the broken line in FIG. 10. In this time period, the vehicle deceleration by engine brake becomes ineffective, so that the vehicle acceleration rises to about 0G, which gives a passenger the "feeling of free running", causing discomfort.

Comparing this, in the automatic transmission equipped with a torque converter, rise of the acceleration during shifting from the third speed stage to the second speed stage is extremely small, as indicated by the one-dot chain line in FIG. 10, so that a passenger never has the "feeling of free running".

Here, in this embodiment, although the seamless-shift transmission is employed as the stepped variable transmission 15, engine brake becomes ineffective during the shifting to the lower speed stage side (down-shifting). Therefore, in this embodiment, during the shifting to the lower speed stage side, the controller 24 operates to send a signal to the secondary drive motors 20 to regenerate kinetic energy of the vehicle 1, thereby generating a brake force. Specifically, in this embodiment, when transmission 15 is shifted to the lower speed stage side, the secondary drive motors 20 during vehicle deceleration, the secondary drive motors 20 are controlled to regenerate the kinetic energy to compensate for the brake force interruption during the speed stage shifting, as indicated by the solid line in FIG. 10, thereby preventing acceleration rise. This makes it possible to obtain sufficient performance as a sporty vehicle, and become free from giving a passenger the "feeling of free running".

As above, in this embodiment, the same level of acceleration rise as that of the auto shift manual-type transmission as indicated by the broken line in FIG. 10 is suppressed by a brake force generated through the regenerative operation of the secondary drive motors 20. Here, a braking torque necessary to obtain a brake force equal to that of normal engine brake is ΔT3 [Nm]. This braking torque ΔT3 can be sufficiently obtained by the regenerative operation of the relatively small-size secondary drive motors 20 so as to effectively suppress the "feeling of free running".

In the vehicle drive system 10 according to the first embodiment, the controller 24 operates to cause the secondary drive motors 20 each serving as an assist motor to generate a drive force to compensate for drive force interruption during speed stage shifting (FIG. 9), so that it is possible to suppress the "feeling of acceleration drop" which would otherwise be given to a passenger, thereby improving vehicle riding comfort. In the vehicle drive system 10 according to the first embodiment, a seamless-shift transmission 15 configured such that a drive force is not substantially interrupted during shifting to the higher speed range side (FIG. 6) is combined with the relatively small-size secondary drive motors 20 for compensating for drive force interruption during shifting to the lower speed stage side. This makes it possible to suppress the drive force interruption during speed stage shifting to provide good riding comfort of the vehicle 1, while avoiding deterioration in mobility performance of the vehicle 1 due to a significant increase in vehicle weight, and significant increase in cost.

The vehicle drive system 10 according to the first embodiment comprises the primary drive motor 16 for generating a drive force for the rear wheels 2a each serving as a primary drive wheel, so that it is possible to realize the electric motor-based traveling mode in which a drive force of the engine 12 is not used (FIG. 7). This makes it possible to drive the vehicle 1 to travel even in an area where traveling of the vehicle 1 by the engine 12 is restricted. Further, when the vehicle 1 is accelerated at a given vehicle speed or more, the controller 24 operates to cause the secondary drive motors 20 to generate a drive force (the time $t_9$ in FIG. 7), so that it becomes possible to realize the electric motor-based traveling mode using a relatively small-size primary drive motor 16. This makes it possible to reduce the weight of the entire vehicle.

In the vehicle drive system 10 according to the first embodiment, each of the secondary drive motors 20 is an in-wheel motor (FIG. 5). Thus, a generated drive force is directly transmitted to the front wheels, so that it is possible to instantaneously add the drive force to the vehicle 1 at a timing when the drive force interruption occurs. This makes it possible to more effectively suppress the feeling of acceleration drop which would otherwise be given to a passenger due to the drive force interruption.

In the vehicle drive system 10 according to the first embodiment, each of the secondary drive motors 20 is an in-wheel motor, and configured to drive a respective one of the front wheels 2b as secondary drive wheels, directly without changing the speed of a rotation output thereof (FIG. 1), so that it is possible to eliminate a need to provide a mechanism for changing the speed of the rotation output of the secondary drive motor 20. This makes it possible to reduce the weight of the vehicle 1.

In the vehicle drive system 10 according to the first embodiment, the primary drive motor 16 does not generate any drive force in the internal combustion engine-based traveling mode (FIG. 7), so that the vehicle 1 is driven based on a drive force generated by the engine 12. Thus, a driver can sufficiently enjoy a feeling of manipulation of the vehicle 1 which is driven to travel based on the engine 12.

In the vehicle drive system 10 according to the first embodiment, a drive force generated by the engine 12 disposed in the front portion of the vehicle 1 is transmitted to the rear wheels 2a so as to drive the rear wheels 2a, so that it is possible to enhance mobility performance of the vehicle 1.

Next, with reference to FIG. 11, a vehicle drive system according to a second embodiment of the present invention will be described.

Figure 11:
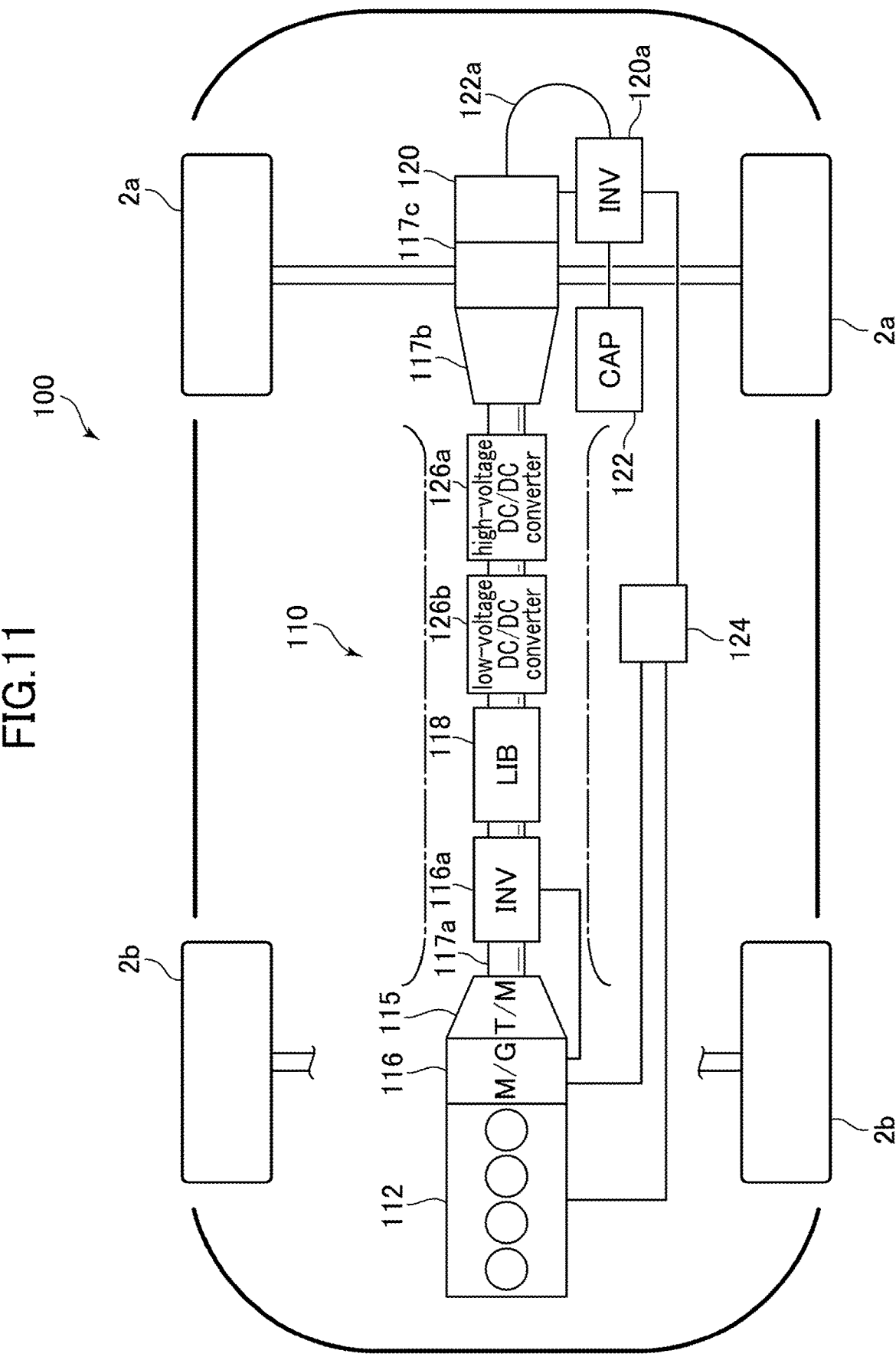
FIG. 11 is a layout diagram of a vehicle equipped with a vehicle drive system according to a second embodiment of the present invention.

FIG. 11 is a layout diagram of a vehicle equipped with the vehicle drive system according to the second embodiment.

The vehicle drive system according to the second embodiment is different from the vehicle drive system according to the first embodiment, in terms of a structure for transmitting a drive force generated by an engine, and the arrangement of a secondary drive motor. Thus, only a part of the vehicle drive system according to the second embodiment different from the vehicle drive system according to the first embodiment will be described here. Further, the common element or component is assigned with the same reference sign, and its description will be omitted.

As shown in FIG. 8, in a vehicle 100 equipped with the vehicle drive system 110 according to the second embodiment, an engine 112 composed of an internal combustion engine is mounted to a front portion of the vehicle 100 at a position forward of a driver seat. The vehicle 100 is a so-called FR (Front Engine Rear Drive) vehicle configured such that a pair of right and left rear wheels 2a each serving as a primary drive wheel are driven by a drive force of the engine 112. As will descried later, the rear wheels 2a are also driven by a primary drive motor 116 and a secondary drive motor 120.

The vehicle drive system 110 according to the second embodiment equipped in the vehicle 100 comprises: the engine 112 for driving the rear wheels 2a; a transmission 115 composed of a stepped variable transmission; a primary drive motor 116 for driving the rear wheels 2a; a battery 118; and a controller 124 serving as a motor control device. The vehicle drive system 110 further comprises a secondary drive motor 120 serving as an assist motor for driving the right and left rear wheels 2a, and a capacitor 122 disposed in the vicinity of the secondary drive motor 120.

The engine 112 is an internal combustion engine for generating a drive force for the rear wheels 2a each serving as a primary drive wheel. In the second embodiment, a drive force of the engine 112 disposed in the front portion of the vehicle 100 is transmitted to the right and left rear wheels through the transmission 115, a propeller shaft 117a, a coupling 117b, and a rear differential gear unit 117c for the rear wheels.

The transmission 115 is a stepped variable transmission configured to change a rotational speed of an output shaft of the engine 112 and output the changed rotational speed, and the output of the transmission 115 is transmitted to the right and rear wheels 2a through the propeller shaft 117a, the coupling 117b and the rear differential gear unit 117c. In the second embodiment, as the transmission 115, a seamless-shift transmission is employed which is configured such that a drive force to be transmitted therethrough is interrupted during shifting to a lower speed stage side, but not substantially interrupted during shifting to a higher speed stage side. The propeller shaft 117a is disposed to pass through a tunnel section which is formed in a central region of a lower portion of the vehicle 100 to extend in a longitudinal (forward-rearward) direction of the vehicle 100, and the coupling 117b is connected to a rear end of the propeller shaft 117a. The coupling 117b is configured to transmit a drive force input thereinto to the rear differential gear unit 117c.

The primary drive motor 116 is an electric motor for generating a drive force for the primary drive wheels, and is disposed behind and in adjacent relation to the engine 112. Further, an inverter 116a is disposed inside the tunnel section of the vehicle 100. A DC voltage of the battery 118 is converted into an AC voltage by the inverter 115a, and the resulting AC voltage is supplied to the primary drive motor 116. The primary drive motor 116 is connected in series with the engine 112 as shown in FIG. 11, so that a drive force generated by the primary drive motor 116 is also transmitted to the rear wheels 2a through the transmission 115. In the second embodiment, as the primary drive motor 116, a 25 kW permanent-magnetic electric motor (permanent magnet synchronous electric motor) is employed which is configured to be driven at 48 V.

The battery 118 is an electric power accumulator for accumulating electric energy mainly for operating the primary drive motor 116. In the second embodiment, a 48V, 3.5 kWh lithium-ion battery (LIB) is used as the battery 118.

The secondary drive motor 120 is provided to generate a drive force for the rear wheels 2a each serving as a primary drive wheel, and integrated with the coupling 117b and the rear differential gear unit 117c. The secondary drive motor 120 is an on-board motor provided on the side of a vehicle body of the vehicle 100, and a drive force generated by the secondary drive motor 120 is transmitted to the right and left rear wheels 2a through the rear differential gear unit 117c without going through the transmission 115. As shown in FIG. 11, an inverter 120a for the secondary drive motor is provided to convert a direct current from the capacitor (CAP) 122 into an alternating current, and supply the resulting alternating current to the secondary drive motor 120.

The capacitor 122 is provided to accumulate regenerative electric power generated by the secondary drive motor 120. As shown in FIG. 11, the capacitor 122 and the inverter 120a are disposed in adjacent relation to each other, in the vicinity of the coupling 117b, the rear differential gear unit 117c and the secondary drive motor 120 which are arranged in a widthwise central region of the vehicle 100. The capacitor 122 is connected in series with the battery 118, and electric power from the capacitor 122 is supplied to the secondary drive motor 120 through the inverter 120a and a wire harness 122a.

Thus, the secondary drive motor 120 is driven at a voltage greater than an inter-terminal voltage of the battery 118. Further, the capacitor 122 is configured to accumulate electric charges at a voltage greater than that of the battery 118. A high-voltage DC/DC converter 126a serving as a voltage converter is connected between the battery 118 and the capacitor 122. This high-voltage DC/DC converter 126a enables bidirectional charging between the battery 118 and the capacitor 122. Further, a low-voltage DC/DC converter 126b is connected between the battery 118 and a 12 V electric component (not illustrated) of the vehicle 100, and is operable to reduce electric charges accumulated in the battery 118 to obtain a lowered voltage of 12 V, and supply the lowered voltage to the above component or the like.

The controller 124 shown in FIG. 11 is configured to control the engine 112, the primary drive motor 116 and the secondary drive motor 120 to execute an electric motor-based traveling mode and an internal combustion engine-based traveling mode. Further, the controller 124 is configured to cause the secondary drive motor 120 to generate a drive force during the shifting of the transmission 115 to the lower speed stage side, to compensate for the drive force interruption during the speed stage shifting. Specifically, the controller 124 may comprise a microprocessor, a memory, an interface circuit, and a program for operating them (which are not illustrated).

The vehicle drive system 110 according to the second embodiment is configured as above, so that a driving force generated by the secondary drive motor 120 serving as an assist motor is applied to the rear wheels 2a each serving as a primary drive wheel without going through the transmission 115. Specifically, the secondary drive motor 120 is disposed downstream of the transmission 115 in a drive force transmission line extending from the engine 112, so that it can drive the rear wheels 2a without going through the transmission 115. Therefore, as with the vehicle drive system 10 according to the first embodiment, the drive force interruption due to the transmission 115 can be compensated for by causing the secondary drive motor 120 to generate a drive force during shifting to the lower speed stage side.

In the vehicle drive system 110 according to the second embodiment, the drive force interruption during the speed stage shifting can be compensated for by driving the rear wheels 2a each serving as a primary drive wheel based on a driving force of the secondary drive motor 120 serving as an assist motor. That is, in the vehicle drive system 110 according to the second embodiment, the driving force of the secondary drive motor 120 serving as an assist motor is applied to the primary drive wheels together with a driving force of the engine 112. However, the driving force of the secondary drive motor 120 is applied to a downstream side of the transmission 115 without going through the transmission 115, so that it can compensate for the drive force interruption in the transmission 115.

Although preferred embodiments of the present invention have been shown and described, it is to be understood that various changes and modifications may be made therein. Particularly, in each of the above embodiments, the vehicle drive system has been applied to an FR vehicle. Alternatively, the present invention may be applied to various types of vehicles, such as a so-called FF vehicle in which an engine is disposed in a front portion of the vehicle, and each front wheel serves as a primary drive wheel, and a so-called RR vehicle in which an engine is disposed in a rear portion of the vehicle, and each rear wheel serves as a primary drive wheel. Further, in each of the above embodiments, the vehicle drive system comprises a primary drive motor for driving a primary drive wheel. Alternatively, the present invention may be applied to a vehicle drive system devoid of the primary drive motor.

Further, in the first embodiments, an in-wheel motor is employed as the assist motor (secondary drive motor 20) to drive a secondary drive wheel. Alternatively, the vehicle drive system of the present invention may be configured to drive the secondary drive wheel by an on-board motor to compensate for the drive force interruption. Further, in the second embodiment, an on-board motor is employed as the assist motor (secondary drive motor 120) to drive a primary drive wheel. Alternatively, the vehicle drive system of the present invention may be configured to drive the primary drive wheel by an in-wheel motor to compensate for the drive force interruption.

LIST OF REFERENCE CHARACTERS

1: vehicle
2a: rear wheel (primary drive wheel)
2b: front wheel (secondary drive wheel)
10: vehicle drive system
12: engine (internal combustion engine)
14: drive force transmitting mechanism
14a: propeller shaft
14b: clutch
15: transmission (stepped variable transmission)
16: primary drive motor (primary drive electric motor)
16a: inverter
18: battery (electric power accumulator)
20: secondary drive motor (an assist motor)
20a: inverter
22: capacitor
22a: bracket
22b: harness
24: controller (motor control device)
26: high-voltage DC/DC converter (voltage converter)
26b: low-voltage DC/DC converter
28: stator
28a: stator base
28b: stator shaft
28c: stator coil
30: rotor
30a: rotor body
30b: rotor coil
32: electrically-insulating liquid chamber
32a: electrically-insulating liquid
34: bearing
36: main shaft
38: countershaft
40: low speed-side gear set
40a: gear
40b: gear
40c: clutch teeth
42: high speed-side gear set
42a: gear
42b: gear
42c: clutch teeth
44: dog clutch
46: dog clutch
48: shift fork
48a: recess
50: shift fork
50a: recess
52: clutch cam ring
52a: cam groove
54: clutch ring 54a: cam protrusion
54b: clutch teeth
56: clutch cam ring
56a: cam groove
58: clutch ring
58a: cam protrusion
58b: clutch teeth
100: vehicle
110: vehicle drive system
112: engine
115: transmission (stepped variable transmission)
116: primary drive motor
116a: inverter
117a: propeller shaft
117b: coupling
117c: rear differential gear unit
118: battery
120: secondary drive motor (an assist motor)
120a: inverter
122: capacitor
122a: wire harness
124: controller (motor control device)
126a: high-voltage DC/DC converter
126b: low-voltage DC/DC converter

The invention claimed is:

1. A vehicle drive system for driving a vehicle using an internal combustion engine, comprising:
   an internal combustion engine configured to generate a drive force for driving a primary drive wheel of the vehicle;
   a stepped variable transmission connected to an output shaft of the internal combustion engine and configured to change a rotational speed of the output shaft of the internal combustion engine and output the changed rotational speed;
   an assist motor provided to apply a drive force to a secondary drive wheel of the vehicle, or apply a drive force to the primary drive wheel without going through the stepped variable transmission; and
   a motor control device configured to control a drive force to be output by the assist motor,
   wherein
   the stepped variable transmission is a seamless-shift transmission configured such that a drive force to be transmitted therethrough is interrupted during shifting down, but not substantially interrupted during shifting up, and
   the motor control device is operable, during the shifting down by the stepped variable transmission, to cause the assist motor to generate a drive force to compensate for the interruption of the drive force.

2. The vehicle drive system as recited in claim 1, which further comprises a primary drive motor provided on a vehicle body of the vehicle and configured to generate a drive force for the primary drive wheel, wherein the motor control device is configured to execute an electric motor-based traveling mode in which the vehicle is driven to travel based on drive forces generated by the primary drive motor and the assist motor, the motor control device being operable, only when accelerating the vehicle at a given vehicle speed or more, in the electric motor-based traveling mode, to cause the assist motor to generate a drive force.

3. The vehicle drive system as recited in claim 1, wherein the assist motor is an in-wheel motor provided in the primary drive wheel or the secondary drive wheel.

4. The vehicle drive system as recited in claim 1, wherein the assist motor is provided to drive the secondary drive wheel, directly without changing a speed of a rotation output thereof.

5. The vehicle drive system as recited in claim 2, wherein the motor control device is configured to execute an internal combustion engine-based traveling mode in which the vehicle is driven to travel based on a drive force generated by the internal combustion engine, the motor control device being operable, in the internal combustion engine-based traveling mode, to inhibit the primary drive motor from generating a drive force.

6. The vehicle drive system as recited in claim 1, which further comprises a drive force transmitting mechanism for transmitting a drive force generated by the internal combustion engine, wherein the internal combustion engine is disposed in a front portion of the vehicle, and wherein the drive force generated by the internal combustion engine is transmitted to a rear wheel as the primary drive wheel, through the drive force transmitting mechanism.

* * * * *